United States Patent
Sato et al.

(10) Patent No.: US 7,373,103 B2
(45) Date of Patent: May 13, 2008

(54) RELAY TERMINAL, BASE STATION, CHARGING SERVER, COMMUNICATION SYSTEM, CHARGING METHOD, PROGRAM COMPUTER DATA SIGNAL, AND STORAGE MEDIUM

(75) Inventors: Hijin Sato, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 886 days.

(21) Appl. No.: 10/432,594

(22) PCT Filed: Oct. 2, 2002

(86) PCT No.: PCT/JP02/10299

§ 371 (c)(1),
(2), (4) Date: Nov. 6, 2003

(87) PCT Pub. No.: WO03/032617

PCT Pub. Date: Apr. 17, 2003

(65) Prior Publication Data

US 2005/0222948 A1    Oct. 6, 2005

(30) Foreign Application Priority Data

Oct. 3, 2001    (JP)    ............................. 2001-307908

(51) Int. Cl.
  *H04B 3/36* (2006.01)
  *H04B 7/14* (2006.01)
(52) U.S. Cl. .................. 455/7; 455/406; 455/41.1; 455/405; 455/41.2; 370/238
(58) Field of Classification Search ................ 455/7, 455/406, 41.1–41.3, 502, 503, 500, 411, 405, 455/519, 408, 456.1; 709/229, 203, 225, 709/200; 370/218, 238, 238.1, 348, 250, 370/389, 451

See application file for complete search history.

(56) References Cited

U.S. PATENT DOCUMENTS

| | | | | |
|---|---|---|---|---|
| 6,963,739 | B2 * | 11/2005 | Dorenbosch et al. | 455/406 |
| 6,970,927 | B1 * | 11/2005 | Stewart et al. | 709/225 |
| 7,206,850 | B2 * | 4/2007 | Ogawa | 709/229 |
| 2001/0053683 | A1 * | 12/2001 | Murayama et al. | 455/406 |
| 2005/0108156 | A1 * | 5/2005 | Sumino et al. | 705/40 |
| 2005/0220101 | A1 * | 10/2005 | Westhoff et al. | 370/389 |
| 2007/0008897 | A1 * | 1/2007 | Denton et al. | 370/250 |
| 2007/0058673 | A1 * | 3/2007 | Leung | 370/466 |

FOREIGN PATENT DOCUMENTS

| | | | |
|---|---|---|---|
| CH | WO9946899 | * | 9/1999 |
| GB | 2336070 | * | 3/1998 |
| JP | 11-134057 | | 5/1999 |
| JP | 11-289349 | | 10/1999 |
| JP | 2001-025066 | | 1/2001 |
| JP | 2001-036674 | | 2/2001 |
| JP | 2001-156694 | | 6/2001 |
| JP | 2002-209028 | | 7/2002 |
| WO | WO 01/39483 A2 | | 5/2001 |

* cited by examiner

*Primary Examiner*—Sujatha Sharma
(74) *Attorney, Agent, or Firm*—Oblon, Spivak, McClelland, Maier & Neustadt, P.C.

(57) ABSTRACT

In a relay terminal A for relaying packet communication between a destination terminal C located outside a service area of a base station Z, and the base station Z, a contribution to relaying is measured and the measurement result is transmitted to a billing server SA configured to store an information communication charge of the relay terminal A, whereby it becomes feasible to give the relay terminal an incentive.

24 Claims, 12 Drawing Sheets

RELAY TERMINAL, BASE STATION, CHARGING SERVER, COMMUNICATION SYSTEM, CHARGING METHOD, PROGRAM COMPUTER DATA SIGNAL, AND STORAGE MEDIUM

TECHNICAL FIELD

The present invention relates to a relay terminal, a base station, a billing server, a communication system, a billing method, a program, a computer data signal, and a storage medium capable of establishing an optional ad hoc network with a radio terminal (relay terminal) located in a service area in order to secure communication with a radio terminal (destination terminal), particularly, with a destination terminal located outside the service area and making an information communication charge reflect a contribution to relaying, particularly, by the relay terminal on the occasion of determining the information communication charge during communication with the destination terminal.

BACKGROUND ART

An ad hoc network in a radio system is normally a network consisting of only radio terminals without intervention of a base station and, for communication with a radio terminal existing in a zone outside a reach of radio waves, i.e., in an uncommunicable zone, packets are transported via radio terminals existing between the source and destination terminals, up to the destination, thereby securing communication.

Therefore, the radio terminals in the ad hoc network have the relaying function and share their own resources for communication of other terminals. This ad hoc network is essentially a self-supporting system like LAN and system for easily constructing a network to secure a communication area.

In recent years, however, studies are under way on applying the technology of such an ad hoc network to the public systems.

The application of the ad hoc network to the public services is mainly to supplement service areas. It is not economical in terms of capital investment to cover all the areas up to sites to which radio waves are hard to reach, e.g., behind buildings. The application of the ad hoc network technology can implement transfer from the system in which the network is entirely in charge of the area covering function, to the system in which some radio terminals supplementally contribute to the function.

Techniques of controlling transport routes on the ad hoc network have actively been studied as the most important technology for implementing this system.

In the ad hoc network, where a radio terminal moves, or where the communication quality heavily degrades, a variety of controls become necessary: for example, it becomes necessary to change a transport route from the source radio terminal to the destination radio terminal to another, to notify relay radio terminals of a forwarding address, and so on. Techniques for these controls can be settled by use of the technologies in wireless LAN, though there is the difference in that communication is conducted via the base station in the public system, and a number of proposals have been made in practice (e.g., Japanese Patent Application Laid-Open No. 11-289349 and others).

DISCLOSURE OF THE INVENTION

In the application of the ad hoc network to the public communication services, however, there arises the problem that the battery of a radio terminal involved in relaying is discharged unawares because of the relaying to another radio terminal bearing no relation thereto. The relaying can cause the radio resources to be divided, and possibly result in decreasing the communication speed of the radio terminal involved in the relaying.

Unless the terminal serving for the relaying for others is given some incentive, it is difficult to expand the service areas through the use of the ad hoc network in the public communication systems. There was no prior art for solving this problem and it was thus difficult to apply the ad hoc network technology to the public communication services.

Therefore, the present invention has been accomplished in view of the above problem and an object of the present invention is to provide a relay terminal, a base station, a billing server, a communication system, a billing method, a program, and a storage medium capable of giving an incentive to a radio terminal performing relaying for another radio terminal on a public network to which the ad hoc network technology is applied.

In order to solve the above problem, a relay terminal of the present invention is a relay terminal for relaying packet communication between a destination terminal and the base station, the relay terminal comprising: measuring means for measuring a contribution to the relaying; and transmitting means for transmitting a measurement result of the contribution to a billing server connected to a network including the base station and configured to store an information communication charge of the relay terminal.

A base station according to the present invention is a base station for implementing packet communication with a destination terminal through a relay terminal, the base station comprising: measuring means for measuring a contribution to relaying by the relay terminal; and transmitting means for transmitting a measurement result of the contribution to a billing server connected to a network including the base station and configured to store an information communication charge of the relay terminal.

According to the present invention, the contribution to relaying is measured and it can be reflected in billing; therefore, it becomes feasible to give the relay terminal an incentive in the billing server.

The contribution is preferably the number of packets relayed by the relay terminal and, in this case, the measuring means comprises identifying means for identifying whether a header included in the packets is one associated with relaying; and a counter configured to increment a count number thereof in proportion to the number of packets transmitted and/or received during relaying when the identifying means identifies an occasion of relaying, and a value proportional to the count number is transmitted as a measurement result of the of the number of packets to the billing server. Since the number of packets can be accurately measured, accurate billing can be performed based thereon.

Preferably, the transmitting means transmits the value proportional to the count number along with identification information obtained by the identifying means, as the measurement result to the billing server, whereby it becomes easier to implement the billing associated with the identification information.

The contribution to the relaying may be a relay time and, in this case, the measuring means comprises identifying means for identifying whether a control message included in the packets represents a start of communication or an end of communication; and calculating means for calculating a time period between a receiving time of the control message at the start of communication and a receiving time of the control message at the end of communication, identified by the identifying means, and the time period is transmitted as the relay time to the billing server. When the control message is included in the packets, it becomes feasible to implement simple contribution transmission.

The contribution may also be an amount of power internally consumed in the relay terminal during the relaying, whereby the user worrying about the discharge of the battery can be given an incentive based thereon.

The contribution may also be an amount of radio resources used by the relay terminal, and the apparatus in this case is preferably configured so that a communication system during the relaying is time division multiple access and so that the measuring means comprises storage means for storing the number of timeslots, the number of carriers, and the number of frames, used in transmission and receiving of the packets; and calculating means for calculating the amount of radio resources as the contribution from the values stored in the storage means.

When the contribution is the amount of radio resources, the apparatus may also be configured so that a communication system during the relaying is code division multiple access and so that the measuring means comprises storage means for storing the number of timeslots, the number of carriers, and the number of codes, used in transmission and receiving of the packets; and calculating means for calculating the amount of radio resources as the contribution from the values stored in the storage means.

In these cases, the user worrying about the use of radio resources can be given an incentive.

When there are a plurality of mentioned relay terminals for relaying packets, the measuring means of each mentioned relay terminal or the base station may be configured to measure as the contribution a value obtained by dividing a physical quantity used for communication in each mentioned relay terminal, by the number of relay terminals, and in this case, by setting a total contribution to a predetermined value, it is feasible to prevent the total incentive amount from increasing excessively.

A communication system may be configured to comprise a base station for relaying the measurement result transmitted from the foregoing relay terminal to the billing server.

A billing server according to the present invention is a billing server for storing an information communication charge of a relay terminal, the billing server comprising: receiving means for receiving a contribution to relaying by the relay terminal for relaying packet communication between a destination terminal and the base station; and billing means for effecting negative billing according to the contribution received by the receiving means, on the information communication charge stored.

According to the present invention, execution of relaying results in effecting negative billing, whereby it becomes feasible to implement provision of an incentive to the relay terminal.

The amount of the negative billing may be set to a given value when the contribution is not less than a reference value, or may be set to a value proportional to a level of the contribution. In addition, the amount of the negative billing can also be set at or below a predetermined maximum amount.

The billing server of the present invention may also be configured so that the contribution by the relay terminal is classified into one group out of a plurality of groups obtained by dividing a set of contributions of relay terminals according to the contributions and so that the negative billing is effected based on a value of a base amount correlated with a weighting factor corresponding to each group. The correlation can be multiplication. This can ensure fairness of billing.

The billing server can also be configured so that when the amount of the negative billing is greater than the information communication charge stored in a predetermined period, a difference between the information communication charge and the amount of the negative billing is stored for a fixed period and the negative billing is effected on a next information communication charge on the basis of the stored difference; this makes it feasible to carry the unused negative billing amount over into the next charge.

A billing method of an information communication charge according to the present invention is a method comprising a step of storing an information communication charge of a relay terminal in a storage device; a step of receiving a contribution to relaying by the relay terminal for relaying packet communication between a destination terminal and the base station; and a step of effecting negative billing calculation according to the received contribution on the information communication charge stored in the storage device.

According to the present invention, execution of relaying results in effecting negative billing, whereby it becomes feasible to give an incentive to the relay terminal.

A program according to the present invention is a program for letting a computer execute a step of storing an information communication charge of a relay terminal in a storage device; and a step of receiving a contribution to relaying by the relay terminal for relaying packet communication between a destination terminal and the base station and effecting negative billing calculation according to the received contribution on the information communication charge stored in the storage device, and a recording medium is a medium in which this program is recorded so that the computer can read.

Another relay terminal according to the present invention is a relay terminal for relaying packet communication between a destination terminal and a base station, the relay terminal comprising: measuring means for measuring a contribution to relaying; and calculating means for calculating from a measurement result by the measuring means, a value to be deducted from an information communication charge in a billing server connected to a network including the base station and configured to store the information communication charge of the relay terminal.

According to the present invention, the calculating means performs the above calculation, whereby it is feasible to lessen the processing in the billing server.

Another billing method of an information communication charge according to the present invention comprises a step of transmitting a contribution to relaying by a relay terminal for relaying packet communication between a destination terminal and a base station, from the relay terminal; and a step of effecting negative billing calculation according to the contribution, on an information communication charge stored in a predetermined storage device.

According to the present invention, execution of relaying results in effecting negative billing, whereby it becomes feasible to give an incentive to the relay terminal.

The billing method of the information communication charge according to the present invention can be configured to comprise an identification step of identifying whether a header included in the packets is one associated with relaying; and a step of incrementing a count number of a counter in proportion to the number of packets transmitted and/or received during relaying when the identification step results in identifying an occasion of relaying, and the transmitting step is to transmit a value proportional to the count number as the contribution; in this case, the number of packets can be measured accurately whereby accurate billing can be implemented.

When the destination terminal is located outside a service area of the base station, the measuring means of the relay terminal can measure the contribution.

When the destination terminal is located outside the service area of the base station, the measuring means of the base station can measure the contribution.

When the destination terminal is located outside the service area of the base station, the receiving means of the billing server can receive the contribution.

In the billing method of the information communication charge, the contribution receiving step can also be carried out when the destination terminal is located outside the service area of the base station.

The contribution receiving step executed by a computer data signal can be carried out when the destination terminal is located outside the service area of the base station. The contribution transmitting step executed in the billing method of the information communication charge can be carried out when the destination terminal is located outside the service area of the base station.

A program of the present invention is a program for letting a computer execute a step of storing an information communication charge of a relay terminal in a storage device; and a step of receiving a contribution to relaying by the relay terminal for relaying packet communication between a destination terminal and a base station and effecting negative billing calculation according to the received contribution on the information communication charge stored in the storage device.

BEST MODE FOR CARRYING OUT THE INVENTION

A relay terminal, a base station, a billing server, a communication system, a billing method, a program, and a storage medium according to an embodiment will be described below. The same elements will be denoted by the same reference symbols, without redundancy of description.

Figure 1:
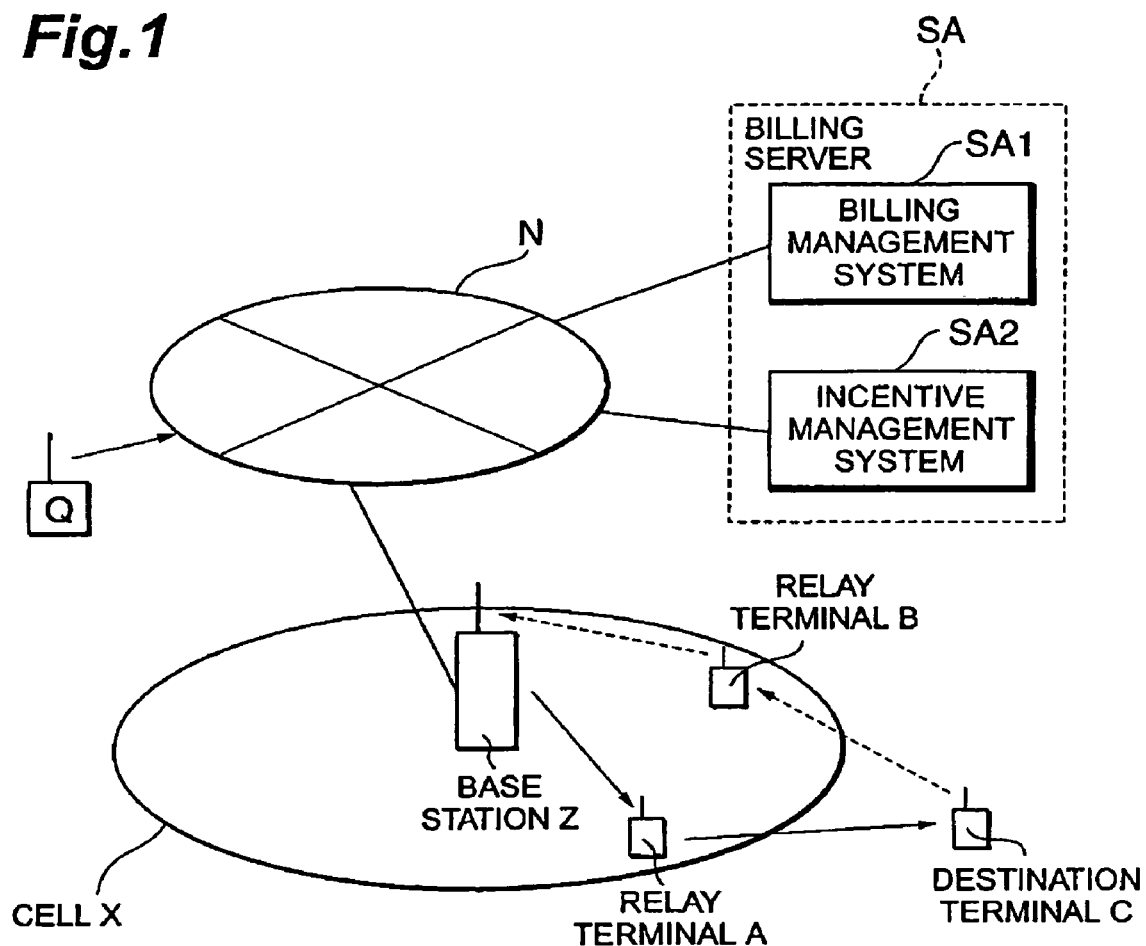
FIG. 1 is a system configuration diagram according to an embodiment.

FIG. 1 is a system configuration diagram according to an embodiment. The base station Z has one cell (service area: zone where radio terminals are communicable with the base station Z) X. Let us assume herein that in the cell X there exist terminal A and terminal B and outside the cell X there exists terminal C. The base station Z is connected to a network N and a billing server SA is connected to the network N. These devices are communicable with each other through the network N.

First, normal communication will be described. A variety of conceivable structures are available for the network N, but the network N herein is assumed to be a PDC packet communication network permitting billing based on the amount of information. It is assumed that physical channels for packet communication have the frame structure of 3-channel time division multiple access (TDMA) and up to three slots are simultaneously accessible in order to achieve increase in data transmission speed by multislot transmission.

In the case where a specific terminal Q connectible to the network N transmits packets to the terminal A in the cell X, the terminal Q first accesses a packet subscriber processing module (PPM: not shown) in the network N through a neighbor base station, to effect packet communication registration with PPM. PPM, receiving a registration request, registers progress of packet communication with a mobile communication service control point (M-SCP: not shown) in the network N and retrieves user information of the terminal Q from M-SCP to execute authentication of the user. When the validity of the user is authenticated, PPM performs a link connection transaction to packet gateway processing equipment (PGW: not shown) located between PPM and M-SCP and sends a packet communication registration response to the terminal Q to initiate packet communication.

For ending packet transmission from the terminal Q, a packet communication registration cancellation request, instead of the packet communication registration request, is transmitted to PPM and in response thereto PPM sends a packet communication cancellation request to M-SCP. Receiving a response to acknowledge the communication cancellation request from M-SCP, PPM sends a packet communication registration cancellation response to the terminal Q and the terminal Q sends a packet communication registration cancellation acknowledgment to PPM. Then PPM performs a link disconnection transaction to PGW to terminate the packet communication.

For forwarding packets from the terminal Q to the terminal A, PGW identifies an IP address included in the received packets, accesses M-SCP on the basis of this address, acquires subscriber information, location information, etc. of the terminal A stored in M-SCP, forwards the packets from the terminal Q to PPM where the terminal A is located, and transmits the packets to the terminal A through the base station Z where the terminal A is located.

Each packet contains data and a header including at least a destination address, a source address, and a number indicating a packet order, and in the network N packets are forwarded in frame structure. A frame contains source and destination addresses, various control bits, data as information to be transmitted, and an error-detection code sequence between flags indicating the start and end of a packet.

After the terminal A starts receiving packets from the base station Z and when the terminal A sends to the base station Z a packet with a header containing information of a packet communication registration cancellation acknowledgment along with the address information and registration number of the terminal A, M-SCP is notified of the number of packets received by the terminal A and the number of received packets is stored along with the user registration information in M-SCP.

The billing server SA is installed in M-SCP or separately from the M-SCP, and a billing management system SA1 in the billing server SA performs billing in proportion to the number of stored packets, as an information communication charge. This information communication charge is stored with the user registration information in a storage device of the billing management system SA1.

Now let us explain a case where data transmission is carried out from the terminal Q to the terminal C located outside the cell X of the base station Z. When packets are transmitted from the specific terminal Q on the network N via the base station Z to the terminal C, packet communication is usually infeasible, because the terminal C is located outside the cell X of the base station Z.

Then let us suppose that packets addressed to the terminal C are relayed on the basis of destination address information added to the received packets by the terminal A present in the area X, whereby the packets are forwarded to the terminal C of the destination. A response from the terminal C is relayed by the terminal C present in the cell X and is sent via the base station Z to the terminal and the billing server SA on the network N. The operation will be detailed below. Each terminal performing relaying like the terminal A and the terminal B will be referred to as a relay terminal, and the terminal C of the destination of packets as a destination terminal.

PGW located upstream of the base station Z identifies an IP address included in the packets received from the terminal Q, accesses M-SCP on the basis of this address, and attempts to acquire the subscriber information and location information of the terminal C stored in M-SCP.

When the location information of the terminal C is unknown, PGW estimates a PPM where the terminal C is expected to be located, on the basis of past location information, and sends a signal to request a confirmation for whether communication with the terminal C is possible, to appropriate terminals A, B located in the cell X of the base station Z located downstream of the PPM. In response to this signal, the terminals A, B for relaying check with the terminal C.

When receiving a response of "communicable" from the terminal C, the terminals A, B notify the PPM of the fact, and the PPM rewrites the location information of the terminal C stored in M-SCP so as to indicate the communicable location through the base station Z by relaying via the relay terminals A, B.

Thereafter, the PPM adds an address of the terminal A being a downward communication relay address, an address of the terminal B being an upward communication relay address, and a flag indicating application of relaying, in addition to the address of the terminal C being a target address, to the header of the packets transmitted from the terminal Q and forwards the packets via the base station Z to the terminal A according to the address of the terminal A.

The terminal A recognizes that the received packets are those to be relayed, and forwards the packets to the terminal C according to the address of the terminal C included in the header. The procedure of communication is the same as that between the terminal A and the base station Z, and the terminal C, after receiving the packets, creates a packet containing data of packet communication registration cancellation acknowledgment information and the header containing the address of the terminal B for relaying, the address and registration number of the terminal C itself, and the flag indicating application of relaying and sends it to the terminal B.

The terminal B recognizes the flag for application of relaying and sends the received packet to the base station Z. In response thereto, the base station Z executes disconnection of the link to PGW through the PPM, so as to terminate the relayed communication.

FIG. 1 illustrates the case where the different relay terminals A, B are used between in the "up direction" in which packets are transmitted toward the base station Z and in the "down direction" in which packets are transmitted from the base station Z. Therefore, the base station Z, terminal A, and terminal C constitute one ad hoc network, while the base station Z, terminal B, and terminal C another ad hoc network.

It is also possible to use the same relay terminal for the both upward and downward communications. For example, where the terminal A relays packets in both the up direction and down direction, only one ad hoc network configuration consisting of the base station Z, terminal A, and terminal C will suffice.

Accordingly, the upward and downward communication operations can be handled independently of each other in the present example. It is also noted that a plurality of relay terminals can be involved in communication in either direction. As described above, the relay terminals B, C can implement virtual expansion of the cell X which is the original cell of the base station Z.

Billing will be described below. An incentive management system SA2 is connected on the network N. When communication is effected with the relay terminals, the incentive management system SA2 collects the result of measurement of quantities indicating levels of relaying, measured at each equipment such as the base station Z, the relay terminals A, B, or the destination terminal C. The system determines incentive amounts on the basis of the collected information.

An incentive is a benefit given according to the contribution of the terminal A or B during the relaying operation, and an incentive amount represents a degree of the contribution to the relaying. The billing server SA determines an information communication charge while reflecting the determined incentive amount in billing.

For performing the billing, contributions of the respective terminals A, B to relaying are first measured. The measurement of contributions can be carried out at the base station Z or at the relay terminals A, B.

First described is a case where the relay terminals A, B themselves measure their contributions. There are a number of measurable parameters for determining the contributions. For example, the parameters include the volume of data relayed by each relay terminal, i.e., the number of relayed packets, a time of relaying (relay time), the amount of radio resources used for relaying, the transmit power, the amount of battery consumption, the throughput during relaying, speed of relaying, and so on. A typical example is the number of packets. The following is the details.

Figure 2:
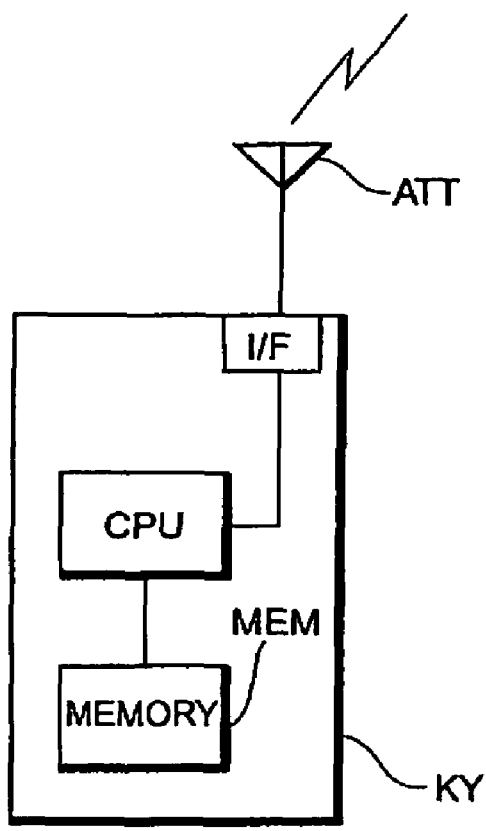
FIG. 2 is a block diagram of a relay terminal.

FIG. 2 is a block diagram of the relay terminal A or B, which is provided with a central processing unit CPU, a memory MEM, and an interface I/F inside a housing KY. The CPU performs data communication with a transmission device (transmitting means) ATt mounted on the housing KY, through the interface I/F, and the transmission device ATt transmits packets received from the outside, to the CPU and transmits packets received from the CPU, to the outside.

This relay terminal A, B is a relay terminal A, B for relaying packet communication between the destination terminal C located outside the cell X of the base station Z, and the base station Z, and is provided with the measuring means (CPU and memory MEM) for measuring a contribution to relaying, and the transmitting means ATt for transmitting the measurement result to the billing server SA connected to the network N including the base station Z and configured to store the information communication charge of the relay terminal A, B. Since the contribution to relaying is measured, it can be reflected in billing, so that an incentive can be given to the radio terminal A, B performing the relaying for the other radio terminals Q, C, on the public network.

The contribution herein is assumed to be the number of packets relayed by the relay terminal A, B. The CPU identifies whether the header included in the received packets is one associated with relaying, on the basis of an identifier (identifying means), and is provided with a counter (which is an internal action of CPU) configured to increment a count number in proportion to the number of packets transmitted and/or received during relaying when the identifying means identifies an occasion of relaying. The CPU transmits a value proportional to this count number as a measurement result of the number of packets (contribution) to the incentive management system SA2 of the billing server SA.

The relay terminal A, B can also add the number of packets as a contribution to the header of a packet immediately after completion of the relaying, after a lapse of an adequate period since completion of the relaying, or during the relaying, but the relay terminal herein creates a message containing information about the number of packets and transmits this message to the billing server SA. The transmission device ATt transmits the value proportional to the count number as the measurement result of the contribution along with the identification information by the identifying means (CPU) to the billing server SA. In this method, since the number of packets can be measured accurately, it becomes feasible to implement accurate billing and facilitate the billing associated with the identification information.

For example, where there is the identification information indicating relaying, the billing management system SA1 or incentive management system SA2 of the billing server SA effects negative billing calculation on the original information communication charge of the relay terminal A, B stored, on the basis of the contribution received by the incentive management system SA2.

For example, when the number of packets is given the minus sign and transmitted to the incentive management system SA2, the billing management system SA1 or incentive management system SA2 calculates a negative information communication charge, thereby implementing negative billing.

Figure 3:
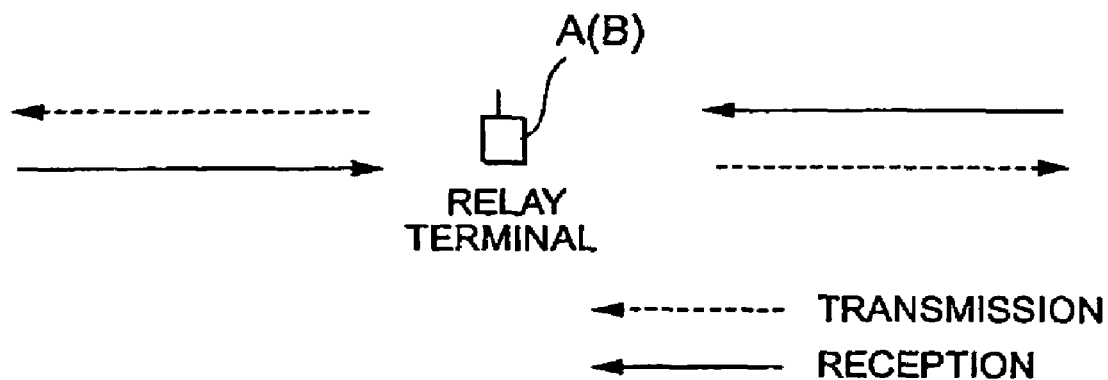
FIG. 3 is an explanatory diagram showing a configuration in which the relay amount is measured during transmission or during receiving at a relay terminal.

There are a variety of methods of measuring the above contribution. In the case where contributions are measured while discriminating transmission from receiving of packets, as shown in FIG. 3, the measurement upon transmission is conducted at the time of forwarding (or transmitting) packets to the base station Z or to the destination terminal C, while the measurement upon receiving is conducted at the time of receiving packets from the base station Z or from the destination terminal C. By measuring packets in either timing, i.e., upon transmission or upon receiving, the number of packets used in relaying can be measured in both the up and down directions.

Figure 4:
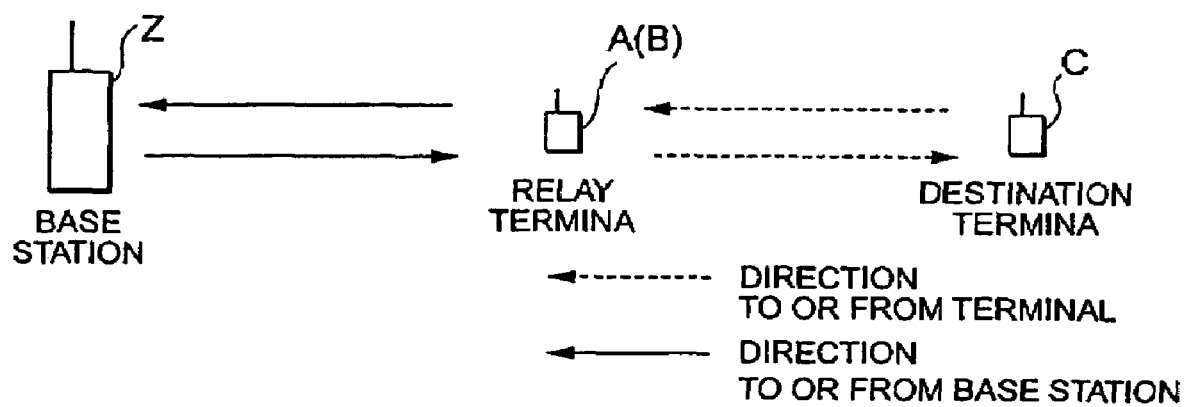
FIG. 4 is an explanatory diagram showing a configuration in which the relay amount is measured during communication with a base station or a destination terminal at a relay terminal.

In the case where the measurement is carried out while discriminating relaying directions during relaying to and from the base station Z from those to and from the destination terminal C, as shown in FIG. 4, the number of packets can be measured by performing the measurement when packets are transmitted to and received from the base station Z or when packets are transmitted to and received from the destination terminal C. Which equipment will transmit packets is determined upon determination of the forwarding (relaying) route in construction of the ad hoc network configuration, and the information thereof is normally included as identifiers of sender and receiver in the relayed data (packets). Therefore, it is possible to implement the discrimination of the relay directions as described above.

Figure 5:
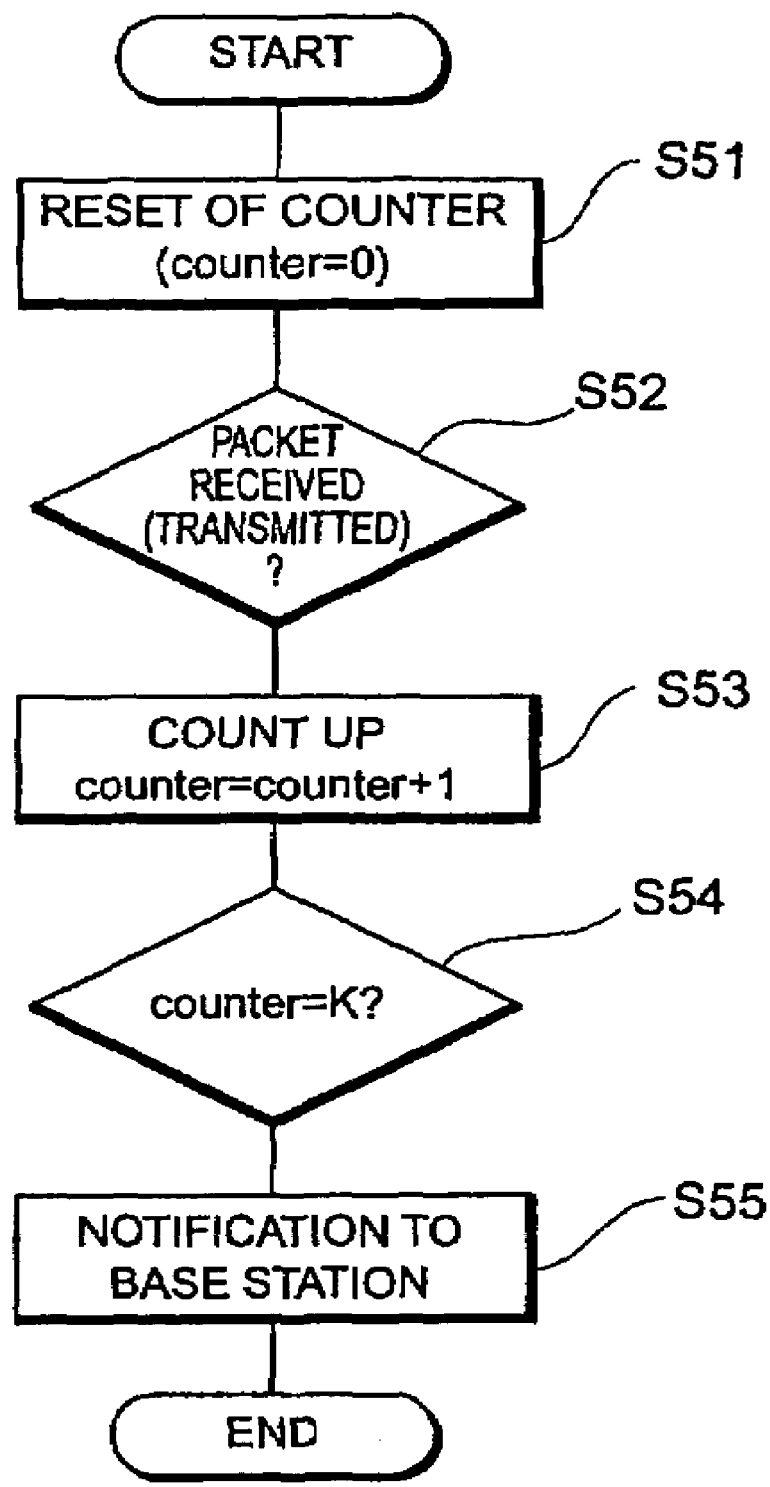
FIG. 5 is a flowchart to illustrate a method of measuring the number of relayed packets.

FIG. 5 shows a specific example of the case where the number of packets is measured as a contribution. This example is based on the premise that the measurement is performed while discriminating transmission from receiving in relaying as shown in FIG. 3. At the time of transmission of relayed packets, the counter of the relay terminal A is reset at zero at first (S51), and, when receiving (transmission) of packets is started (S52), the count number is incremented by one at every transmission of a relayed packet (S53).

When the counter up to K is counted up to K (S54), i.e., immediately before reset, the counter notifies the base station Z of an output pulse indicating the completion of count-up and the identifier of the terminal A, B (S55). Since the number of packets is the product of the count number (K) and output pulses indicating completion of count-ups, the value proportional to the count number is transmitted to the billing server SA as a result.

The example of FIG. 5 will be described below on the premise of the case where the measurement is performed while discriminating the relay directions A, B as shown in FIG. 4. At first the counter is reset at zero (S51), and upon transmission and receiving of relayed packets, the relay terminal A confirms that the sender of the relayed packets is the base station Z, from the header thereof. When the sender is the base station Z (S52), the counter is incremented by one (S53).

When the counter up to K is counted up to K (S54), the counter notifies the base station Z of an output pulse indicating the completion of count-up and the identifier of the terminal A (S55). When the sender is not the base station but the destination terminal C, the relay terminal B transmits the value proportional to the count number, as in the case of the relay terminal A.

The incentive management system SA2 memorizes the number of notifications of output pulses indicating completion of count-ups from the counter and can calculate the number of relayed packets according to (the number of notifications)×(count number).

When the measurement is carried out at the relay terminals, the measurement result is transmitted via the base station to the incentive management system SA2; when the measurement is done at the base station, the measurement result is directly transmitted to the incentive management system SA2. This transmission does not have to be carried out at frequent intervals. A plurality of transmission times, e.g., times of change of date, occasions before OFF of power, etc., can be set independently of the value of the measurement result, and the measurement result can be transmitted at least once within a period of calculation of a charge amount. The above counter can be reset after the transmission of the measurement result.

As described above, when the contribution is measured at the relay terminal A, B, the measurement result of the contribution (the number of packets or the value proportional thereto) and the identifier to identify the relay terminal A, B are transmitted to the base station Z, and the base station Z transmits these to the incentive management system SA2 connected to the network N. The incentive management system SA2 memorizes the above measurement result corresponding to the identifier of the relay terminal A, B. The identifier of each terminal equipment can be one of a terminal number, an IP address, a subscriber (registration) number, etc. commonly used.

The contribution can be a relay time instead of the number of packets. In this case, the CPU as the measuring means identifies whether the control message in the header of the packets received during relaying represents a start of communication or an end of communication (identifying means), calculates a time period between a receiving time of the control message at the start of communication and a receiving time of the control message at the end of communication, identified by the identifying means, (calculating means), and sends this time period as the relay time to the billing server SA. In this case, simple contribution transmission can be achieved when the control message is included in the packets. The billing server SA effects negative billing proportional to the relay time.

The relay time can be measured in the above-stated configuration in the case where one relay terminal A is involved in the upward and downward communications; whereas, in the case where the relay terminal A is in charge of only downward communication, the measurement can be implemented by adding the control message indicating an end of communication, to the header of the last packet transmitted from the terminal Q. In the case where the relay terminal B is in charge of only upward communication, the measurement can be implemented by adding the control message indicating an end of communication, to the header of the last packet transmitted from the terminal C.

In systems without transmission and receiving of these control messages, the relay time is measured as follows. Since the communication system during relaying is the time division multiple access (TDMA), for example, supposing three unit timeslots (Ts) are used by ten frames, the relay time can be calculated according to $3 \times Ts \times 10$. Here Ts is the length of a unit timeslot (unit: second).

For measuring the relay time, it is necessary to measure a period of time from start to end of communication; when the relay terminal A, B relays the control messages representing the start and end of communication like a connection request message and a disconnection request message, the initiation and termination of the measurement can also be timed with reference to these messages.

The above contribution may also be an amount of power internally consumed in the relay terminal during the relaying. In this case, the users worrying about discharge of battery can be given incentives. The CPU measures the amount of internally consumed power in the relay terminal A, B and transmits it as a contribution. The amount of internally consumed power can be measured based on a change of voltage of the battery not shown. A decrease of voltage results from an increase in the amount of internally consumed power.

The above contribution may also be an amount of radio resources used by the relay terminal A, B. In this case, the users worrying about use of radio resources can be given incentives. Since the communication system during the relaying is TDMA, the computer as the measuring means (including CPU) is provided with a memory MEM for storing the number of timeslots, the number of carriers, and the number of frames, used in transmission and receiving of packets, and a CPU as the calculating means for calculating the amount of radio resources as a contribution from the values stored in the memory MEM.

Namely, in the present example, supposing three timeslots are used by ten frames, the amount of radio resources used is calculated according to $3 \times 10 \times$ (the number of carriers used in each frame).

On the other hand, in the case where the communication system during relaying is (wideband) code division multiple access (CDMA), the computer as the measuring means stores in the memory MEM, the number of timeslots, the number of carriers, and the number of spreading codes for modulation, used in transmission and receiving of packets, and the CPU as the calculating means calculates the amount of radio resources as a contribution from the values stored in the memory MEM. Namely, in the case of the (W-)CDMA system, where the number of timeslots is 3 and the number of carriers in each frame is 10, the amount of radio resources can be calculated according to $3 \times 10 \times$ (the number of spreading codes used).

In the case where the number of relay terminals for relaying packets is two or more (including a case of series connection), the measuring means of each relay terminal can also measure as the contribution a value obtained by dividing a physical quantity used for communication at each relay terminal (the number of packets or the like), by the number of relay terminals. This results in decreasing the contribution of each relay terminal per communication, and it is thus feasible to prevent increase of the contribution or discount amount as a whole of communication.

If the packet header is configured to contain addresses of intervening terminals, the number of addresses agrees with the number of relay terminals contributing to relaying. Contributions of the respective relay terminals can be set equal to each other in the case of the relay terminals being connected in series; however, in the case where the different relay terminals are used between upward communication and downward communication as described above, their contributions are naturally different from each other and the contributions can be measured separately to the upward communication and to the downward communication.

The above communication system is provided with the base station Z for relaying the measurement result transmitted from the relay terminal to the billing server SA. Namely, this transmission can be any transmission by which the measurement result is eventually transmitted to the billing server SA, and the measurement result does not have to be transmitted directly to the billing server SA.

The object to be transmitted from the relay terminals A, B does not always have to be the raw measurement result, but may be a value to be deducted from the aforementioned information communication charge; this value can be calculated from the measurement result by the CPU as the calculating means. For example, it can be contemplated that the CPU ranks a measurement result and transmits a value corresponding to its rank to the billing server SA.

The above billing method comprises the step of transmitting from the relay terminal A, B the contribution to relaying by the relay terminal A, B for relaying packet communication between the destination terminal C existing outside the service area X of the base station Z, and the base station Z; and the step of effecting negative billing calculation according to the contribution on the information communication charge stored in the predetermined storage device in the billing server SA, and this billing method also enables provision of an incentive to the relay terminal A, B engaged in relaying for the other radio terminals Q, C.

The billing method in this case comprises the identification step of identifying whether the header included in the packets is one associated with relaying; and the step of incrementing the count number of the aforementioned counter in proportion to the number of packets transmitted and/or received during relaying when the identification step results in identifying an occasion of relaying, and the aforementioned transmission step is to transmit the value proportional to the count number as the contribution.

A specific detailed configuration of the relay terminal A will be described below.

Figure 6:
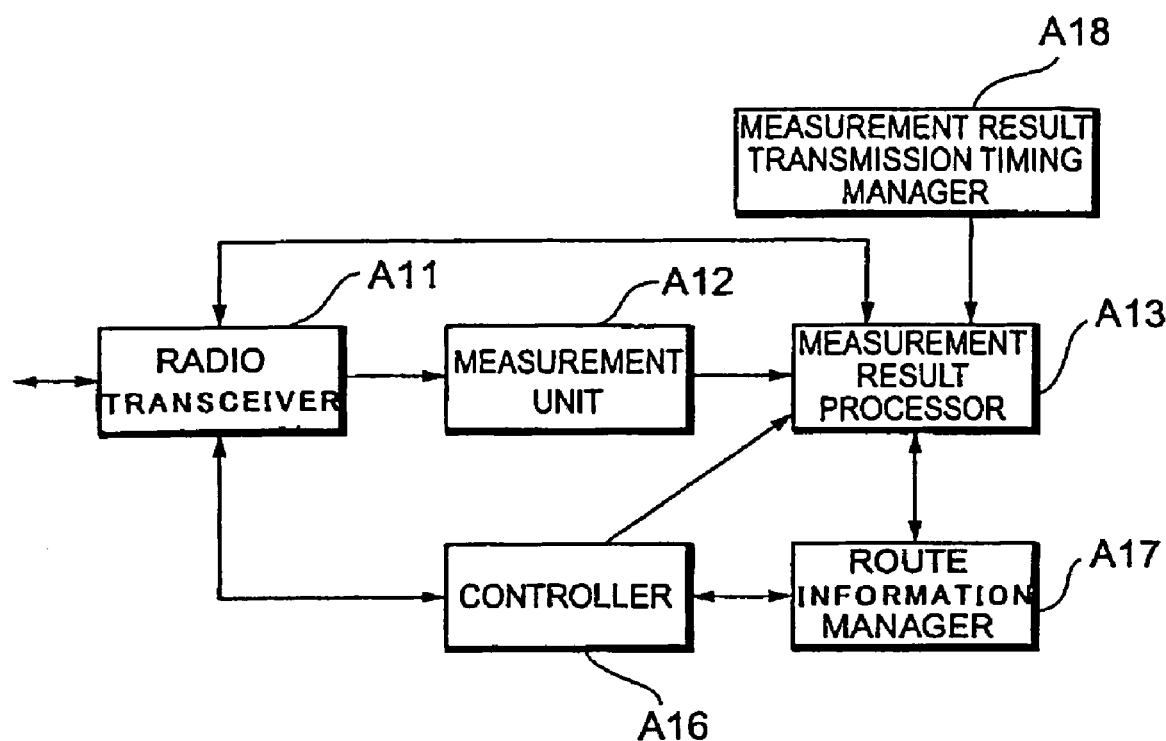
FIG. 6 is a block diagram of a relay terminal.

FIG. 6 shows the detailed configuration of the relay terminal A configured to measure the contribution. The relay terminal A is comprised of a radio transceiver A11, a measurement unit A12, a measurement result processor A13, a measurement result transmission timing manager A18, a controller A16, and a route information manager A17. The radio transceiver A11 corresponds to the aforementioned transmission device ATt and the other components to the CPU and memory.

The radio transceiver A11 transmits and receives packets, control signals, etc. to and from the base station Z and other terminals.

The measurement unit A12 measures a contribution to relaying. For example, in the control of FIG. 5, the measurement unit A12 manages the counter to monitor transmission and receiving of relayed packets at the transceiver A11; the result of the monitoring operation is the contribution.

The measurement result processor A13 stores the measurement result by the measurement unit A12 in correspondence to the identifier of the terminal A. In the case of multihop relaying described later, the measurement result processor A13 calculates a final measurement result as a contribution according to a hop count on the basis of the information about the hop count from the route information manager A17.

The measurement result transmission timing manager A18 manages the timing of transmitting the measurement result to the incentive management system SA2.

In response to a signal from the measurement result transmission timing manager A18, the measurement result processor A13 transmits the measurement result (with the identifier) to the radio transceiver A11 and these are transmitted to the base station Z. The base station Z transmits them to the incentive management system SA2.

In another conceivable configuration, the incentive management system SA2 determines the transmission timing of the measurement result and sends the timing to the base station Z, the base station Z notifies the relay terminal A of the timing, and the notification is delivered to the measurement result processor A13 through processing of the controller A16 of the relay terminal A. In this configuration, the measurement result processor A13 sends the measurement result on the basis of the notification, and thus the relay terminal does not have to be equipped with the measurement result transmission timing manager A18.

Since the controller A16 collects the information about the relay route managed by the route information manager A17, the relay terminal A needs to include it in order to transmit and receive control signals. The information about the relay route collected herein is stored in the route information manager A17. Since the information about the relay route is information varying with time, the route information is successively updated. The configuration of the relay terminal B is the same as that of the relay terminal A.

The configuration of the base station Z will be described below in the case where the contribution is measured at the relay terminals.

Figure 7:
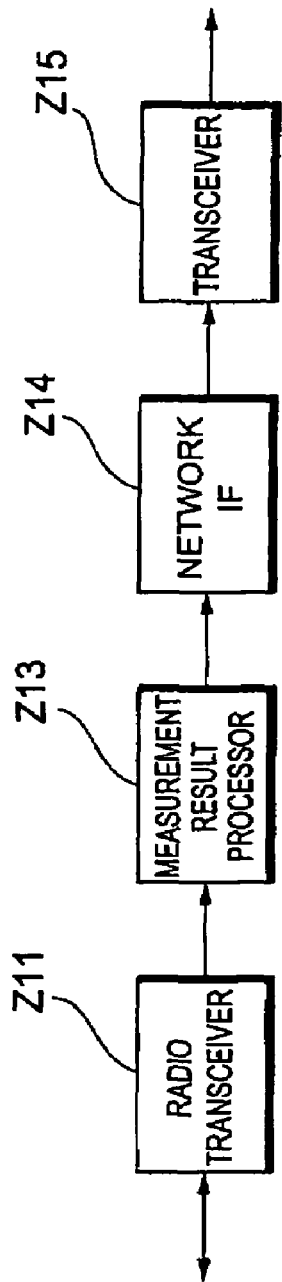
FIG. 7 is a block diagram of a base station configured so as not to measure the relay amount.

FIG. 7 shows the configuration of the base station in the case where the contribution is not measured at the base station Z. The base station Z configured not to measure the contribution (relay amount) is constructed in the simple configuration. A radio transceiver Z11 receives the result of measurement by the relay terminal A, B and a measurement result processor Z13 stores the measurement result in correspondence to the identifier of the relay terminal. The measurement result is immediately transmitted via network IF (interface) Z14 and transceiver Z15 to the incentive management system SA2.

Another configuration of the base station Z will be described below in the case where the base station Z is configured to measure the contribution. In this case, the basic configuration of the base station Z is the same as the configuration of the relay terminal shown in FIG. 2 and the base station is further wired to the network N. The base station Z is a base station configured to perform packet communication through the relay terminals A, B with the destination terminal C located outside the service area X thereof, and is provided with the measuring means as a computer for measuring the contribution to relaying by each relay terminal A, B, and the transmitting means (a transmission device for transmission to the network N side: transceiver Z15 in FIG. 10) for transmitting the measurement result to the billing server SA connected to the network N including the base station Z and configured to store the information communication charges of the relay terminals.

When the base station Z measures the contribution of the relay terminal A, B, the contribution is assumed to be the number of packets transmitted to the relay terminal A and/or received from the relay terminal B. Namely, the computer as the measuring means of the base station Z identifies whether the header included in the packets is one associated with relaying (identifying means), and is provided with a counter (an internal function of the computer of the base station Z) for incrementing its count number in proportion to the number of packets transmitted to the relay terminal A and/or received from the relay terminal B during relaying when the identifying means identifies an occasion of relaying, and the base station transmits a value proportional to the count number as a measurement result of the number of packets to the incentive management system SA2 of the billing server SA.

The measurement method shown in FIG. 5 can also be applied to the case where the relay amount is measured at the base station Z. The counter is counted up by one upon transmission and receiving of a relayed packet. When the counter up to K is counted up to K, it transmits an output pulse (referred to as a count value) indicating completion of count-up. The count value and the identifier of the relay terminal are transmitted to the incentive management system SA2 connected to the network N. This point is only the difference from the case where the measurement is carried out at the relay terminals, and the number of packets can be calculated from the count value and the count number K.

The transmission device, which serves as the transmitting means of the base station Z to perform transmission to the network N side, transmits to the billing server SA the value proportional to the above count number as a measurement result along with the identification information by the identifying means, and the inclusion of the identification information enables the billing server SA to effect negative billing.

The contribution to relaying can also be a relay time of each relay terminal A, B. The computer as the measuring means of the base station Z identifies whether a control message included in packets transmitted or received represents a start of communication or an end of communication (identifying means), calculates a time period between a receiving time of the control message at the start of communication and a receiving time of the control message at the end of communication, identified by the identifying means, (calculating means), and transmits the time period as a relay time of each relay terminal A, B to the billing server SA.

In this case, where the base station performs packet communication with each relay terminal A, B, the above control message is added to the header on the occasion of transmission to the relay terminal A, and the relay terminal B is arranged to preliminarily add the above control message to the header on the occasion of receiving.

For measuring the relay time, it is necessary to measure a period of time from start to end of communication; in the case where the base station relays control messages representing the start and end of communication like a connection request message and a disconnection request message, the start and end of measurement can be timed with reference to these messages.

The contribution can also be the amount of power internally consumed in each relay terminal A, B during relaying. The measurement of the amount of internally consumed power can be conducted by letting each relay terminal A, B measure the amount of internally consumed power and letting the base station Z receive it; or the measurement may also be indirectly conducted by estimating the amount of internally consumed power in each relay terminal A, B from the above relay time measured. The amount of internally consumed power can be determined more accurately if the model of each relay terminal A, B and/or the intensity of received waves from each terminal is measured or known.

The contribution measured at the base station Z can also be the amount of radio resources used by each relay terminal A, B.

When the communication system during relaying is TDMA, the computer of the base station Z as the measuring means stores in the memory MEM (memory means) the number of timeslots, the number of carriers, and the number of frames, used in transmission and receiving of packets to and from each relay terminal A, B, and calculates the amount of radio resources as a contribution by the same method as in the case where it is calculated at the relay terminals, from the values stored in the memory MEM (calculating means). During transmission to the relay terminal A, the base station can measure the number of timeslots used in the transmission, the number of carriers included in each frame, and the number of frames used. The same also applies to the measurement during receiving from the relay terminal B.

When the communication system during relaying is CDMA, the computer of the base station Z as the measuring means stores the number of timeslots used in transmission and receiving of packets, the number of carriers included in each frame, and the number of spreading codes in the memory MEM, and calculates the amount of radio resources as the above contribution from the values stored in the memory MEM (calculating means). The technique of the calculation is much the same as the method of calculation at each relay terminal A, B.

When the number of relay terminals for relaying packets is two or more (including the case of series connection), the transmitting means for transmitting the measurement result to the network interface side of the base station Z transmits a value obtained by dividing a physical quantity used in each relay terminal (the number of packets or the like), by the number of relay terminals, along with the information about the corresponding relay terminal (identifier) to the billing server SA. This function is much the same as in the case of the relay terminals. When the relay terminals are connected in series, the number of addresses of intervening terminals in the header included in the packets transmitted to the relay terminal during transmission agrees with the number of relay terminals.

There are a variety of techniques of measuring the contribution.

Figure 8:
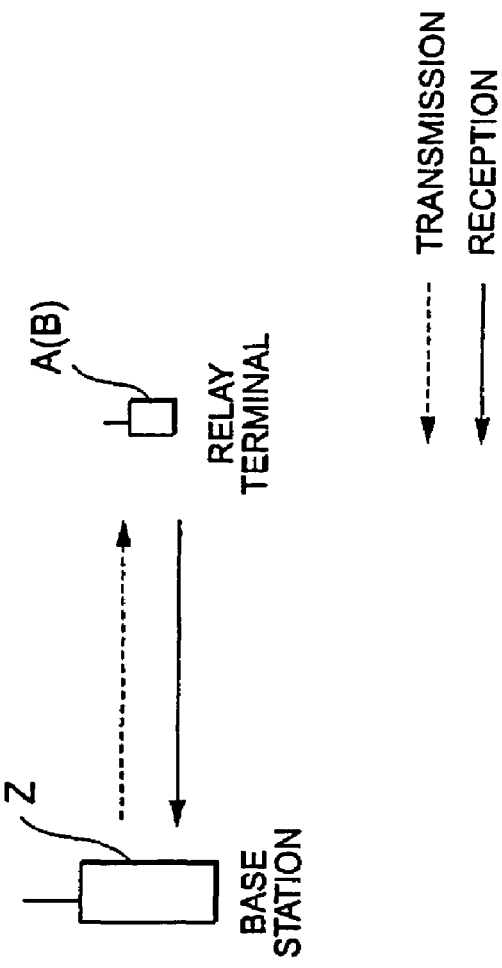
FIG. 8 is an explanatory diagram showing a configuration in which the relay amount is measured at a base station.

FIG. 8 shows an example of measurement to measure the relay amount at the base station Z. In the case where the base station Z measures the relay amount, it measures contributions in both the downward communication and upward communication. The base station needs to manage the results of measurement by the base station Z and the identifiers of the relay terminals A, B during transmission and receiving carried out by the base station Z. For this reason, the base station Z has a management table (memory MEM) for managing the measurement results in correspondence to the identifiers of the terminals A, B and regularly transmits the information in the management table to the incentive management system SA2 connected to the network N. The management table is reset after the transmission.

The multihop communication case will be described below.

Figure 9:
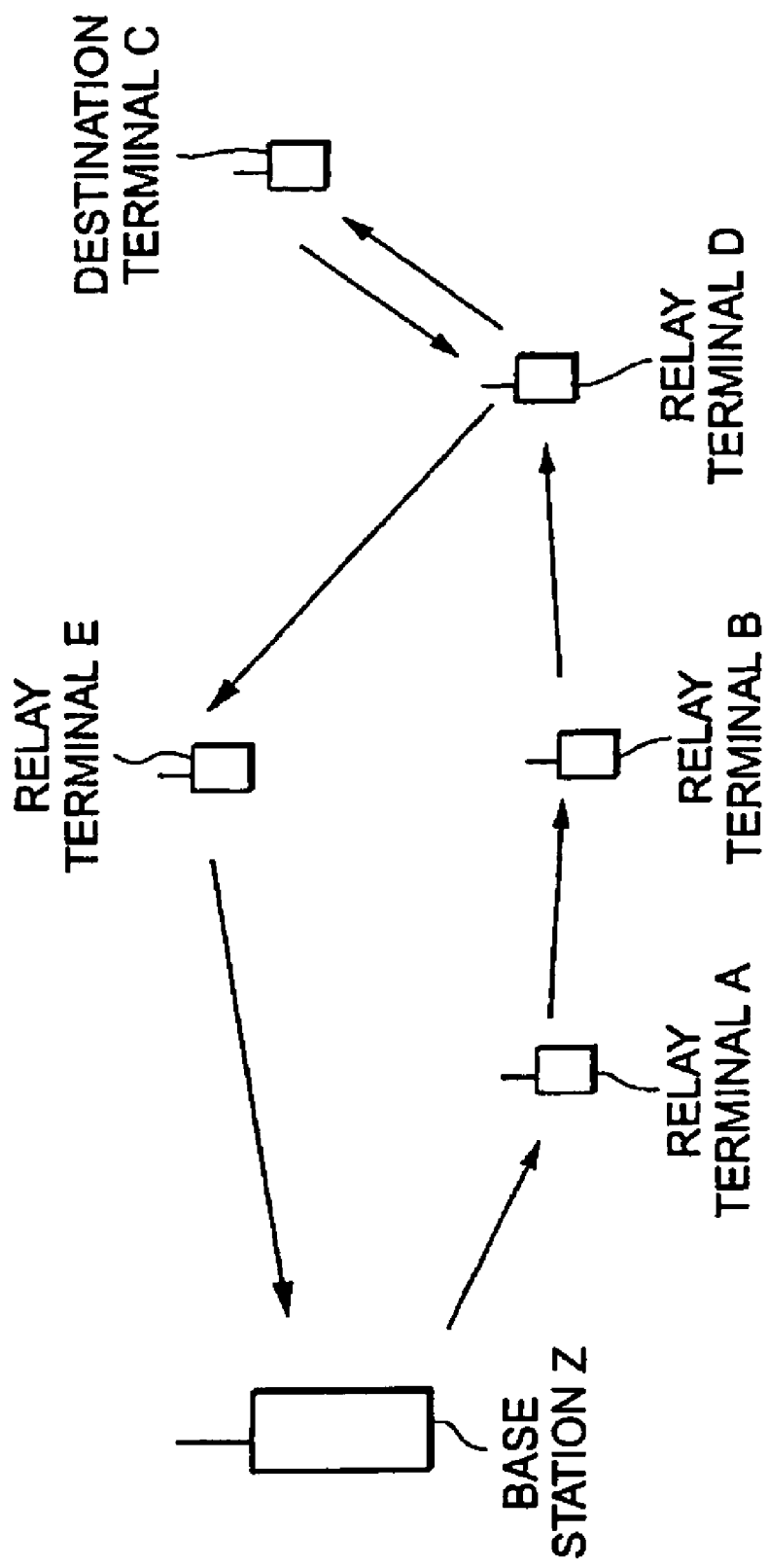
FIG. 9 is an explanatory diagram to illustrate an operation during multihop-base relaying.

Suppose packets were transmitted through the relay route as shown in FIG. 9. In the multihop communication case where there exist a plurality of relay terminals between the base station Z and the destination terminal C, when each relay terminal measures the relay amount, it transmits a value obtained by dividing a physical quantity (the number of packets or the like) used during relaying, by a hop count, as a final measurement result (contribution) to the incentive management system SA2. Of course, the measurement result is transmitted via the base station Z in the case where the measurement is carried out at the relay terminals.

There exist the relay terminals A, B, D, and E between the base station Z and the destination terminal C. The relay route of packets in the down direction from the base station Z to the destination terminal C is base station Z→A→B→D→destination terminal C. The relay route of packets in the up direction from the destination terminal to the base station is destination terminal C→D→E→base station Z.

At this time, let Ma, Mb, and Me be physical quantities utilized for relaying at the respective terminals A, B, and E, Mdup be a physical quantity utilized for upward relaying at the relay terminal D, and Mddn be a physical quantity utilized for downward relaying at D. Then final measurement results (contributions) at the respective terminals are as follows.

TABLE 1

| Terminal A; | Ma/3 |
|---|---|
| Terminal B; | Mb/3 |
| Terminal D; | Mddn/3 + Mdup/2 |
| Terminal E; | Me/2 |

In the multihop communication case where there exist a plurality of relay terminals between the base station Z and the destination terminal C, as described above, the measurement at the relay terminals can be implemented as follows: each relay terminal counts the hop count up and rewrites the header of packets, and it is reversely notified of the final hop count at the destination terminal C or at the base station Z, whereby the relay terminals can share the information about the hop count of relaying.

In the present example, where the number of relay terminals for relaying packets is two or more, for example, the measuring means of the relay terminal D, concerning each of the upward communication and downward communication, measures as the contribution the value obtained by dividing the physical quantity (Mdd) used in communication at the relay terminal D, by the number of relay terminals (3 in the down direction or 2 in the up direction), and the transmitting means of the relay terminal D transmits this value to the billing server SA.

On the other hand, in the case of the system being one in which the base station Z manages the information about the relay route, it is also feasible to implement a configuration in which the base station Z measures and manages the relay amount of each relay terminal on the basis of the route information held by the base station Z, without notifying the relay terminals of the hop count of relaying. The relay terminals or the base station Z acquires the hop count from the information about the relay route.

Namely, in the case where the base station Z is configured to measure the relay amount and where the number of relay terminals for relaying packets is two or more, the relay route (the number of terminals or the hop count) in the downward direction from the base station Z side and the relay route (the number of terminals or the hop count) in the upward direction from the base station Z side are known.

The number of packets transmitted from the base station Z in the downward communication case, as the above physical quantity, is divided by the number of terminals in the relay route of the downward communication and the number of packets arriving at the base station Z in the upward communication case is divided by the number of terminals in the relay route of the upward communication; for example, the contributions about the relay terminal D can be measured as contributions Mddn/3 and Mdup/2.

In other words, in the present example, where the number of relay terminals for relaying packets is two or more, for example, the base station Z is arranged as to each of the upward communication and downward communication, for example, about the relay terminal D so that the measuring means thereof measures the value obtained by dividing the physical quantity (Mdd) used in communication at the relay terminal D, by the number of relay terminals (3 in the down direction or 2 in the up direction), as the aforementioned contribution and transmits this value to the billing server SA.

In such case, the total contribution is set to a predetermined value, whereby it is feasible to prevent the total incentive amount from increasing excessively.

When the incentive management system SA2 of the billing server SA receives the contribution (measurement result) to relaying by each relay terminal A, B, as described above, the incentive management system SA2 calculates an incentive amount, and transmits this incentive amount to the billing management system SA1 to effect negative billing at the billing management system SA1; or the incentive management system SA2 retrieves the information communication charge stored in the billing management system SA1 and effects negative billing.

Namely, the billing server SA is a computer for storing the information communication charges of the relay terminals A, B, and the billing server SA receives the contribution to relaying by the relay terminal A, B for relaying packet communication between the destination terminal C located outside the cell X of the base station Z, and the base station Z from the base station Z side (receiving means) and effects negative billing according to the contribution received by the receiving means, on the information communication charge of each relay terminal A, B stored.

In other words, the billing server SA calculates the incentive amount according to the contribution and deducts this incentive amount from the information communication charge. The incentive amount is calculated as follows: a quantity indicating a level of relaying measured at the base station Z or at each terminal, i.e., the relay amount (contribution) is stored in the incentive management system SA2 on the network N and the calculation operation is carried out in the system.

A detailed configuration of the base station Z will be described below.

Figure 10:
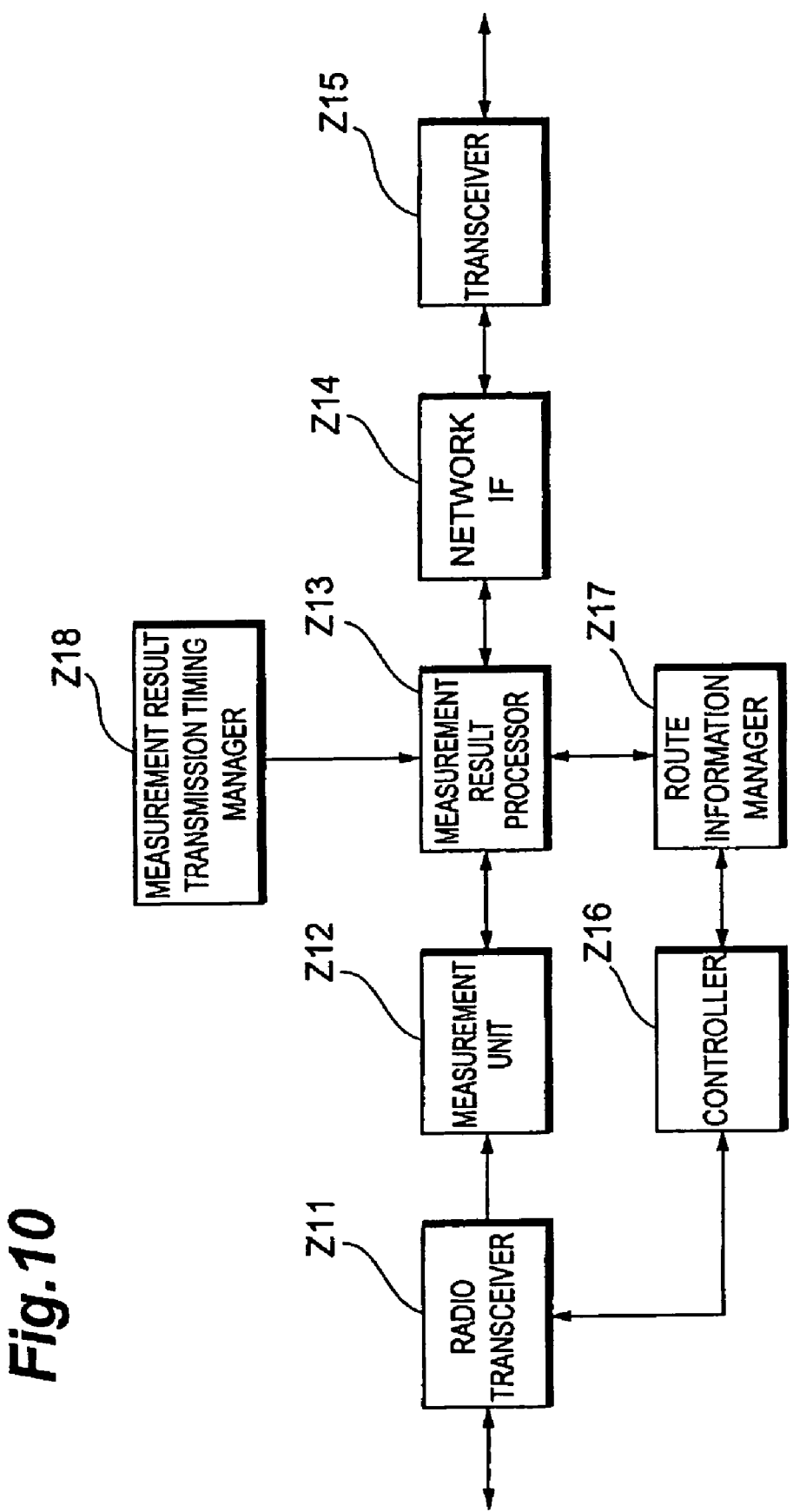
FIG. 10 is a block diagram of a base station configured to measure the relay amount.

FIG. 10 shows the configuration of the base station where the base station Z measures the relay amount, and in the case of measuring the contribution, the base station Z is comprised of a radio transceiver Z11, a measurement unit Z12, a measurement result processor Z, a measurement result transmission timing manager Z18, a controller Z16, a network IF part Z14, a transceiver Z15, and a route manager 17. The radio transmitter Z11 corresponds to the transmission device ATt in FIG. 2, and the other components to the CPU and memory MEM.

The radio transceiver Z11 transmits and receives packets, control signals, etc. to and from the aforementioned relay terminals. The measurement unit Z12 is a part for measuring the contribution. For example, in the example shown in FIG. 5, the measurement unit manages the counter to monitor the transmission and receiving of relayed packets at the transceiver Z15; as a result of the monitoring, the value proportional to the count number is obtained as a measurement result.

The measurement result processor Z13 stores the measurement result by the measurement unit Z12 in correspondence to the identifier of the relay terminal, and calculates a final measurement result as a relay amount according to a hop count on the basis of the information about the hop count from the route information manager Z17 in the case of multihop relaying.

The measurement result transmission timing manager Z18 manages the timing of transmission of the measurement result to the incentive management system SA2. In response to a signal from the measurement result transmission timing manager Z18, the measurement result processor Z13 sends the measurement result (with the identifier) via the network IF part Z14 and transceiver Z15 to the incentive management system SA2.

It can also be contemplated that the incentive management system SA2 determines the transmission timing of the measurement result and notifies the base station Z of the timing; in this case, the base station does not have to be equipped with the measurement result transmission timing manager Z18.

Since the controller Z16 collects the information about the relay route managed by the route information manager Z17, the base station has to be equipped with the controller Z16 in order to transmit and receive control signals to and from the relay terminals. The information about the relay route collected herein is stored in the route information manager Z17. Since the information about the relay route is information varying with time, the route information is successively updated.

Figure 11:
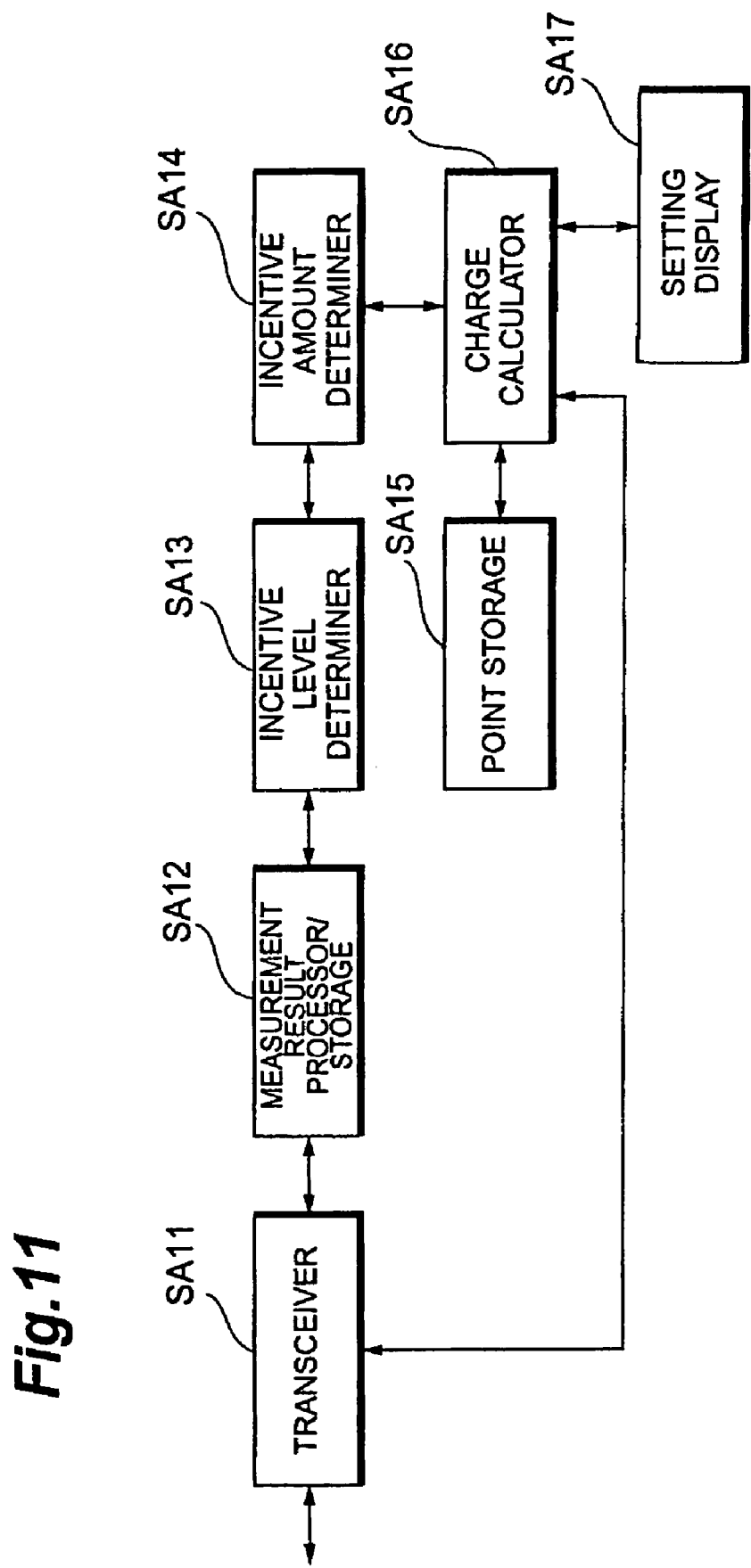
FIG. 11 is a block diagram of an incentive management system.

FIG. 11 shows a configuration of the incentive management system SA2. The incentive management system SA2 is comprised of a transceiver SA11, a measurement result processor/storage SA12, an incentive level determiner SA13, an incentive amount determiner SA14, a charge calculator SA16, a point storage SA15, and a setting display SA17, and is constructed of a computer.

The transceiver SA11 receives the measurement result of the contribution from the base station Z via the network N and transmits the control signals including a response thereto and others.

The measurement result processor/storage SA12 receives the received measurement result of contribution from the transceiver SA11, rearranges data in order of levels of measurement results, and stores the received result in correspondence to the identifier of the relay terminal A, B.

The incentive level determiner SA13 performs grouping of the measurement result on the basis of a predetermined reference value for the measurement result and maps each group onto an incentive level.

The incentive amount determiner SA14 calculates an incentive amount of each incentive level on the basis of predetermined weight and base unit of incentive amount. The incentive levels and the calculation of incentive amount will be detailed later.

The charge calculator SA16 calculates a charge amount according to the charge amount calculation flow described later and shown in FIGS. 12 and 13. The charge calculator SA16 receives the information about the information communication charge of each terminal A, B from the billing management system SA1 via the transceiver SA11 and uses it for the calculation of charge amount. The result of the calculation of charge amount is sent via the transceiver SA11 to the billing management system SA1.

The point storage SA15 stores points as past incentive amounts held, in correspondence to holding periods and identifiers of relay terminals.

Figure 12:
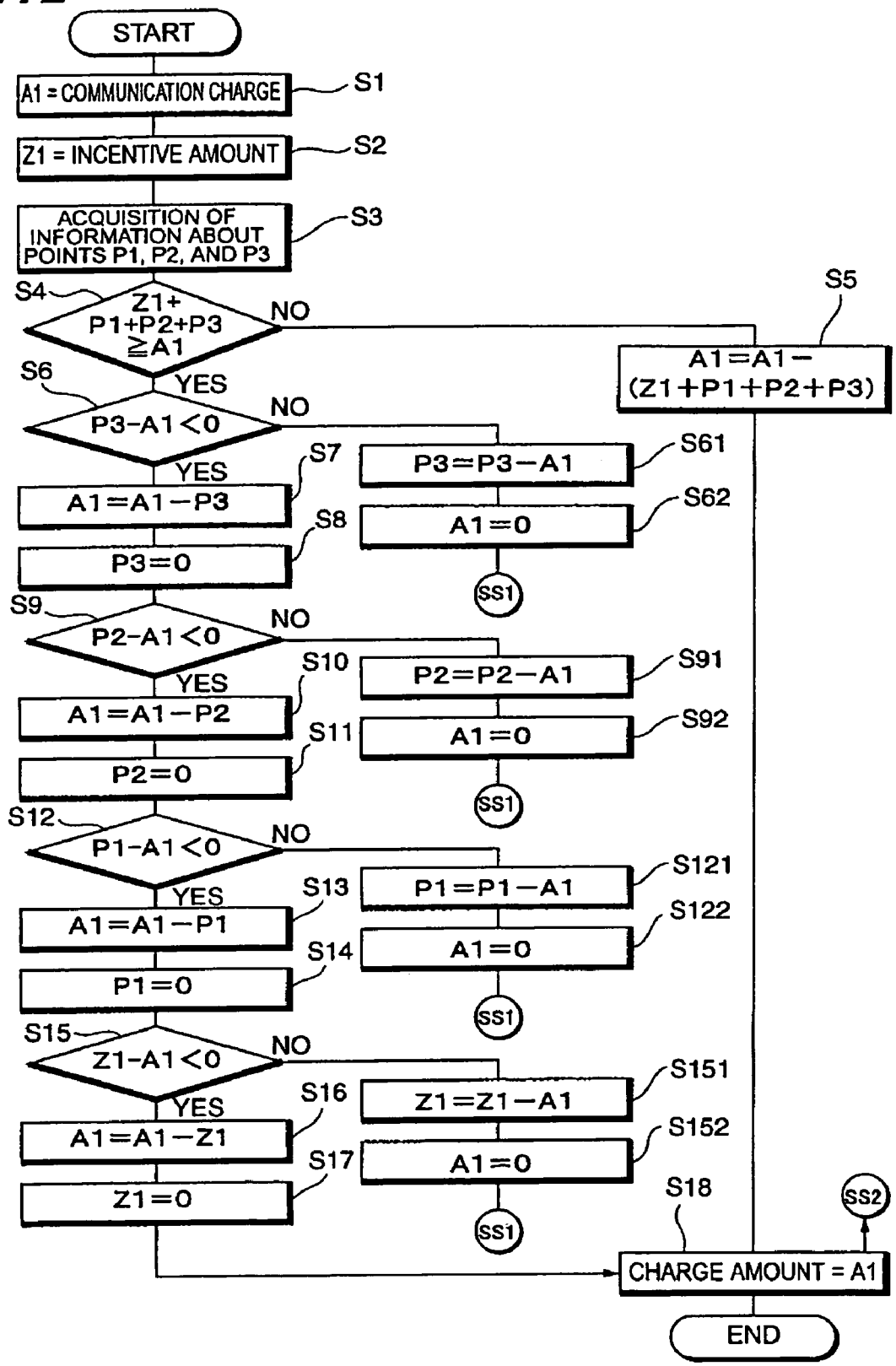
FIG. 12 is a flowchart to illustrate the charge calculating process.
Figure 13:
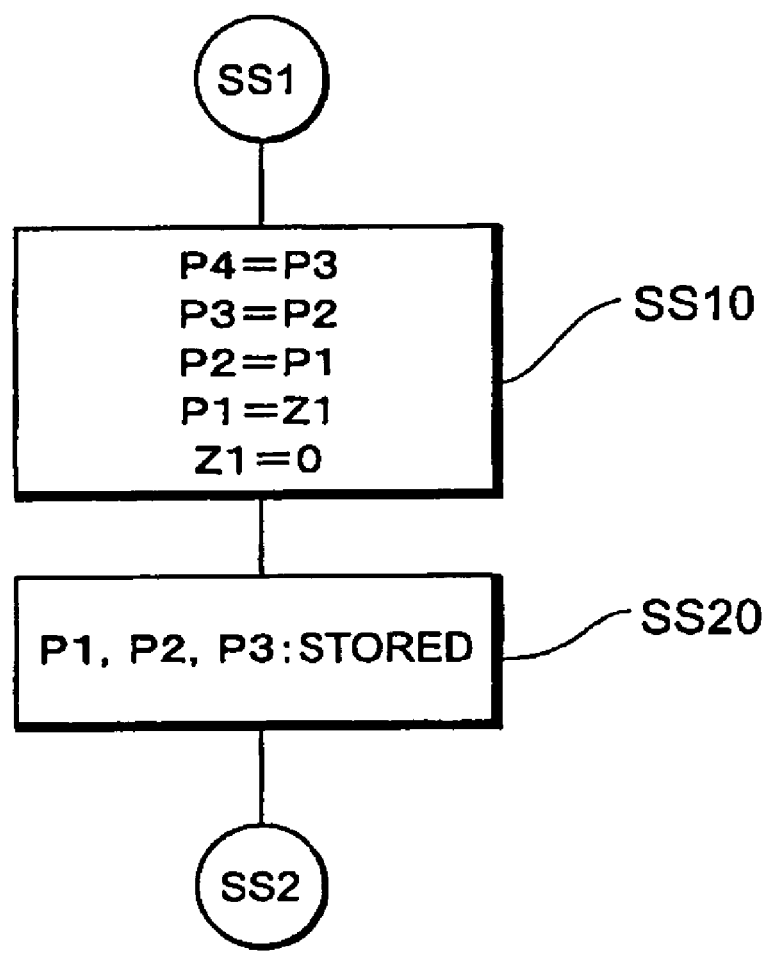
FIG. 13 is a flowchart to illustrate the charge calculating process.

The charge calculator SA16 acquires the point information from the point storage SA15 and performs a calculation process according to the charge amount calculation flow shown in FIGS. 12 and 13. The charge calculator SA16 transmits a new point calculated based on the charge calculation flow, to the point storage SA15, and the point storage SA15 stores the point information.

The setting display SA17 has an input interface through which parameters to be preliminarily set, such as the reference value of the measurement result used in the grouping, the weights, the base unit (U) of the incentive amount, etc., can be set from the outside, and an output interface for display of the setting result and calculation result. The parameters set herein are transmitted via the charge calculator SA16 to each processing part.

There are a variety of conceivable techniques of calculating the incentive amount. Three calculation techniques will be detailed below.

The first method is a method of determining a fixed incentive amount. The present method is a method of providing a fixed value as an incentive amount to a relay terminal having performed relaying with a measurement of a contribution (relay amount) being not less than a certain value (hereinafter referred to as a reference value S). This method can be implemented by setting the reference value S and an incentive amount T for the reference value S in the incentive management system SA2.

The incentive management system SA2 compares the received measurement result of the contribution (relay amount) with the reference value S and determines the incentive amount of T only when the measurement result of the relay amount is greater than the reference value. Namely, in the present example, when the level of the contribution of each relay terminal received by the incentive management system SA2 is not less than the reference value S, the amount of negative billing in the billing management system SA1 or in the incentive management system SA2 is set at the given value T. Since the present method achieves simple determination of the incentive amount, it can lessen the processing of the incentive management system SA2.

The second method is a method of determining a weighted incentive amount. The present method is a method of determining an incentive amount according to a relay amount measured, in which a measurement result of a contribution is mapped onto a map defining incentive levels and is weighted according to a corresponding level and in which an incentive amount is then determined based on the weighted contribution. The flow of determination of the weighted incentive amount (1) to (4) will be described below.

(1) First, grouping into groups Gi is carried out based on measurement results of contributions. A case of grouping into five groups will be described below as an example. The number of terminals belonging to each group Gi is denoted by MSi. The population of grouping is a set of a plurality of practical measurement results. The size of the population is appropriately set.

(2) Incentive levels Li are set in five steps (i=5), and the groups Gi are mapped onto the incentive levels Li. In this case, the measurement results of contributions are arranged in descending order, and a group (rank) Gi is determined based on in which top percentage range a terminal in question falls relative to the total number of terminals for which incentive amounts are to be determined. This method yields the following mapping.

TABLE 2

| top 20%; | rank G1 → incentive level L1 |
| top 20%-40%; | rank G2 → incentive level L2 |
| top 40%-60%; | rank G3 → incentive level L3 |
| top 60%-80%; | rank G4 → incentive level L4 |
| top 80%-100%; | rank G5 → incentive level L5 |

In another potential way, a maximum measurement result of relay amount is extracted from the entire set, the measurement result groups Gi in the ranges of not less than 80%, 80%-60%, 60%-40%, 40%-20%, and 20%-0% of the maximum are generated on the basis of the maximum, and the group Gi can be determined based on in which group among them the measurement result of the terminal in question falls.

(3) Then weights Wi are given to the respective incentive levels as follows. It is assumed herein that there is the relation of 1<W1<W2<W3<W4<W5. Terminals in the same group are given the same weight.

TABLE 3 incentive level L1 → weight W1
incentive level L2 → weight W2
incentive level L3 → weight W3
incentive level L4 → weight W4
incentive level L5 → weight W5

(4) Incentive amounts Ti are determined according to the incentive levels Li as follows. The base unit U of incentive amount herein is a basic incentive amount per terminal and is a value preliminarily set in the incentive management system SA2 as the weights Wi were.

TABLE 4 incentive level L1 → T1 = weight W1 × base unit U of incentive amount
incentive level L2 → T2 = weight W2 × base unit U of incentive amount
incentive level L3 → T3 = weight W3 × base unit U of incentive amount
incentive level L4 → T4 = weight W4 × base unit U of incentive amount
incentive level L5 → T5 = weight W5 × base unit U of incentive amount With processing according to the above flow, the total incentive amount given to all the terminals for one month (predetermined period), ΣALL, is given by Eq (1) below.

$$\sum ALL = \sum_{i=1}^{N} (MSi \times Wi) \times U \quad (1)$$

In the mobile communication systems handling multimedia, service items are expected to grow increasingly diverse. For example, the service contents become diverse, e.g., a fast communication service at a specific speed ensured, a best effort communication service to implement communication only in the presence of radio resources, a utilization-time-limited service, etc., and billing ways also become diverse corresponding thereto. In such cases, incentive amounts have to be determined according to the service contents.

For this purpose, the incentive management system SA2 can effect weighting based on information of those service contents in addition to the measurement results of contributions to determine the incentive amounts.

Since the determining method of the weighted incentive amount determines the incentive amounts according to contributions, it is a determining method equitable to the terminals.

This method is a method of classifying a contribution of a relay terminal (a total over a predetermined period) into one group among a plurality of groups separated according to contributions from a set of contributions of relay terminals and effecting the aforementioned negative billing on the basis of a value of a weighting factor corresponding to each group correlated with the base fee.

Let n be the number of groups utilized in different periods in the mapping for one relay terminal. The billing server SA classifies each of contributions (relay amounts) in the different periods of each relay terminal, into a group set of groups Gi separated according to contributions from a set of contributions of relay terminals, correlates weighting factors corresponding to the respective groups, with the base unit (base fee) U and adds up them to obtain an incentive amount, and then deducts it from the information communication charge, thereby effecting negative billing. The correlation in the present example is multiplication, and by replacing N with n in the right-hand side of Eq (1), we can obtain the incentive amount ALL for one month of one terminal.

The third method is a method of determining the incentive amount on the basis of expenditure of an information communication charge of a telecommunications carrier. If the area coverage is low, or if communication is done via a number of relay terminals, the incentive amount paid to the relay terminals can become greater than the information communication charge collected from subscribers by the telecommunications carrier. In such cases, use of the third method permits the total ΣALL of incentive amounts to all the terminals to be limited to below a certain value or below ΣALL(limit).

Namely, the present method is a method of allocating up to the upper limit of incentive amount ΣALL(limit) to terminals contributing to relaying. The allocation to terminals is adapted to each of the foregoing first and second incentive determination methods. Namely, the amount of negative billing effected at the billing server SA is set to be not more than the predetermined maximum amount.

In the determination method of the fixed incentive amount being the first method, for example, supposing there are two hundred terminals serving for relaying at or above a given quantity, the upper limit is equally allocated to all the two hundred terminals as objects, ΣALL(limit)÷200, and the equally divided amounts are determined as incentive amounts.

Furthermore, in the case of the determination method of the weighted incentive amount being the second method, the incentive amount can be determined as follows. From Eq (1), the relationship of ΣALL(limit) with Wi and MSi is given by Eq (2) below. It is, however, assumed that N represents the total number of terminals and all relay amounts over a predetermined period per relay terminal are added up.

$$\sum ALL(\text{limit}) \geq \sum_{i=1}^{N} (MSi \times Wi) \times U \quad (2)$$

Here MSi are determined by the foregoing flow (1) to (2) and Wi are preliminarily set in the incentive management system SA2 as described previously. From the relationship of Eq (2), the base unit U of incentive amount can be calculated as in Eq (3) below.

$$U = \Sigma ALL(\text{lim it})/(MSi \times Wi) \quad (3)$$

By executing the process of the foregoing flow (4) using the calculated value of U, we can obtain the incentive amount of each relay terminal. With use of the present method, the allocation of incentive amounts is fair, because the determining method of the incentive amount according to the relay amount is applied; in addition, because the upper limit is set to the total incentive amount, the incentive amount can be set so as to prevent the incentive amount paid to the relay terminals from exceeding the information communication charge collected from subscribers by the telecommunications carrier.

The foregoing billing method of the information communication charge comprises the step of storing the information communication charge of the relay terminal in the storage device of the billing server SA; the step of receiving the contribution to relaying by the relay terminal for relaying packet communication between the destination terminal C existing outside the service area of the base station Z, and the base station Z; and the step of effecting the negative billing calculation according to the received contribution on the information communication charge stored in the storage device, and is executed in the billing server SA.

In the above embodiment, since the contribution to relaying is measured, it can be reflected in the billing; since the negative billing is effected in the billing server SA, it is feasible to implement provision of the incentive to the relay terminal. The amount of negative billing may also be set to a value proportional to the level of the contribution to relaying.

The billing server SA is constructed of a computer, and a program installed in this computer is a program for letting the computer execute: the step of storing the information communication charge of the relay terminal in the storage device; and the step of receiving the contribution to relaying by the relay terminal A, B for relaying packet communication between the destination terminal C located outside the service area of the base station Z, and the base station Z and effecting the negative billing calculation according to the received contribution on the information communication charge stored in the storage device. For installing the program into the computer, a recording medium in which the program is recorded so that the computer can read, is set in a reading device of the computer, and the program is read thereby.

This program or any program for executing the methods described in the present specification can be transmitted while being included in a carrier wave. The program thus transmitted is read by the computer and the computer executes the processing thereof. For example, a computer data signal in the case of the above program is a computer data signal included in a carrier wave, which makes the computer having read the signal, execute: the step of storing the information communication charge of the relay terminal in the storage device; and the step of receiving the contribution to relaying by the relay terminal for relaying packet communication between the destination terminal and the base station and effecting the negative billing calculation according to the received contribution on the information communication charge stored in the storage device.

The incentive amount calculated by the foregoing determination flow of the incentive amount is reflected in the information communication charge of the relay terminal, and a charge which a subscriber has to pay to the telecommunications carrier in fact is basically a difference obtained by subtracting a calculated incentive amount from an information communication charge for communication conducted by the terminal. This process is carried out in the billing management system SA1.

The calculation can be done at regular intervals, or once a month, and the final charge can be determined based thereon. However, when the calculated incentive amount is compared with the information communication charge for communication conducted by the terminal, the calculated incentive amount can be greater in certain cases. In such cases the charge to the subscriber can be determined to zero.

When the result of calculation of the charge for a specific month is that the calculated incentive amount is greater than the information communication charge for communication by the terminal, it is also possible to provide a service of retaining the incentive amount for a while and carry the excess incentive amount over to the next calculation timing (e.g., the next month).

Namely, in the case where the amount of negative billing is greater than the information communication charge stored in a predetermined period, the billing server SA stores the difference between them for a certain period and effects the negative billing on the next information communication charge on the basis of the stored value. In this case, the negative billing not used can be carried over to the next time, whereby it is feasible to promote interests of the telecommunications carrier and users.

FIG. 12 shows the flow in this case. An incentive amount held will be referred to hereinafter as a point. Let us suppose one relay terminal holds three past points P1, P2, and P3. In the case where three past points can be held, a charge amount reflecting the points is calculated. The present processing is carried out for determining a charge amount of a certain terminal in the incentive management system SA2, and charge amounts of all terminals can be determined by repeating similar processing for the terminals of all subscribers.

First, information about an information communication charge A1 of a certain terminal is acquired from the billing management system SA1 (S1). The information communication charge A1 is a charge for only conduct of communication, which reflects no incentive yet. Then an incentive amount Z1 is determined according to the aforementioned determination flow of incentive amount (S2). The system acquires the three past points P1, P2, and P3 of this terminal (S3). The point in the oldest period is P3 and the latest point is P1.

The sum of Z1+P1+P2+P3 is compared with the information communication charge A1 (S4). Since the sum of Z1+P1+P2+P3 is the total of the current incentive amount and all the points held, it gives an aggregate sum of incentive amounts that can be utilized in the present processing by the terminal.

When the sum of Z1+P1+P2+P3 is smaller, it means that the information communication charge A1 is greater than the total available incentive, and the charge A1 finally billed is calculated as a difference between the sum of Z+P1+P2+P3 and the original A1 (S5).

On the other hand, when the sum of Z+P1+P2+P3 is greater, a point held as an incentive available in the next period can be determined from a remainder resulting from subtraction of A1 from the sum of Z+P1+P2+P3.

However, since only three past points can be held herein, current P3 cannot be utilized in the next period. For this reason, in order to keep the amount held in the next period as large as possible, the points are used in order from the oldest on the occasion of subtracting the information communication charge A1 from the available incentive.

Therefore, P3 is compared with A1 (S6). If A1 is greater, the value of A1−P3 replaces A1 (S7) and is then compared with P2 (S9). Since this is the case where the information communication charge A1 is greater than the oldest point P3, the process here is a process for using P3 entirely (or setting P3 to zero (S8)) and also using the next oldest point.

When the result of the comparison between P2 and A1 is that A1 is greater again, the result of subtraction of P2 from replaced A1, further replaces A1 (S10). Since the next oldest point P2 is also used up at this stage, P2 is also set to zero (S11).

The processing as described above is also repeated for P1 and Z1.

Namely, P1 is further compared with A1 (S12). When the result of the comparison is also that A1 is greater again, the result of subtraction of P1 from replaced A1, further replaces A1 (S13). Since the point P1 is also used up at this stage, P1 is set to zero as well (S14).

Finally, the present incentive amount Z1 is compared with A1 (S15). When the result of the comparison is that A is greater again, the result of subtraction of Z1 from replaced A1, further replaces A1 (S16). Since the incentive amount Z1 is also used up at this stage, Z1 is set to zero as well (S17).

A1 obtained as a result of the processing heretofore is the difference resulting from the operation of subtracting the points P3, P2, P1, and Z1 in order from the original information communication charge A1 and is the charge A1 finally billed.

On the other hand, during the stages of using the points in order from the oldest, A can be smaller than a certain point. For example, this corresponds to the case where, in the comparison between P3 and A1 (S4), A1 is smaller than P3. In this case, there remains some point even after use of the point P3 and the charge A1 billed is set at zero (S61). The remaining point after subtraction of A1 from P3 is tentatively substituted into P3 (S61). At this stage, there is no change in the values of P2, P1, and Z1.

When A1 is smaller in the comparison between P2 and A1 (S9) in the foregoing flow, there remains some point even after use of the point P2. The remaining point of P2–A1 is tentatively substituted into P2 (S91) and the charge A1 billed is set at zero (S92). At this stage, P3 is zero, but there is no change in the values of P1 and Z1.

When A1 is smaller in the comparison between P1 and A1 (S12), there remains some point even after use of the point P1. The remaining point of P1–A is tentatively substituted into P1 (S121) and the charge A1 billed is set at zero (S122). At this stage, P3 and P2 are zero, but there is no change in the value of Z1.

When A1 is smaller in the comparison between Z1 and A (S15), there remains some point even after use of Z1. The remaining point of Z1–A is tentatively substituted into Z1 (S151) and the charge A1 billed is set at zero (S152). At this stage, P3, P2, and P1 are zero.

Since the original information communication charge was smaller than the sum of the points and incentive amount, A1 obtained as a result of this processing becomes zero.

FIG. 13 shows the flow in the case where A1 becomes zero, as described above, and it starts from substep SS1. In order to hold new points necessary in the timing of calculation of the next charge amount, the oldest point P3 is rewritten into P4, the next oldest point P2 into the oldest point P3, the point P1 into the point P2, and the present incentive amount Z1 into the latest point P1, and the incentive amount Z1 is set to 0 (SS10).

Since the points P1, P2, and P3 obtained as a result are held as new points utilized in the next calculation timing, they are fed to and stored in a point storage area in the storage device. Then this flow is terminated (SS2) and the processing returns to FIG. 12 to display or store the charge A1 (S18).

As described above, the above system can substantiate implementation of the mobile communication systems in which the ad hoc network is applied to the public services and in which the services can be provided to terminals located in areas that cannot be covered by any base station. Namely, while a subscriber's terminal is serving to assist communication for others, some load is exerted on communication of the subscriber; this made it difficult to apply the ad hoc network to the public services. In contrast to it, the present system gives an incentive to a terminal involved in relaying so as to serve to assist communication of others, whereby the load of relaying can be relieved on the subscriber.

For this reason, the telecommunication carriers do not have to spend money for impractical capital investment for covering sites where radio waves are unlikely to reach, with service areas, and it becomes feasible to implement virtual expansion of the original service areas by making use of the subscriber's terminals. On the other hand, the subscribers are given incentives as compensations for application of their own terminals to communications for others, whereby the information communication charges paid to the carriers can be decreased.

Since the weighted incentives are calculated according to the respective relay amounts, it is feasible to ensure fairness among the relay terminals. Since the various parameters necessary for the calculation of incentive amounts, e.g., for the weighting, are set from the outside, the system is superior in flexibility.

Furthermore, since the upper limit of the total incentive amount is set, the incentive amount paid to the relay terminals can be prevented from exceeding the information communication charge collected from the subscribers by the telecommunications carrier.

If in the calculation of the charge billed at regular intervals the incentive amount is greater than the actual information communication charge, the difference of the information communication charge from the incentive amount is stored for the fixed period and the incentive amount thus stored is reflected in the billed charge on the occasion of calculating the next billed charge; therefore, the available period of incentive can be lengthened. In this case, the possibility of capability of using the incentive becomes higher even if a period of serving to relaying is different from a period of carrying out a lot of communications. The aforementioned program can be transmitted in the form of the computer data signal included in the carrier wave, to the relay terminal and be executed in the relay terminal.

The relay terminal, base station, billing server, communication system, billing method, computer data signal, program, and storage medium according to the present invention made it feasible to provide the incentive to the radio terminal engaged in relaying for the other radio terminals, on the public network to which the ad hoc technology is applied.

Figure 14:
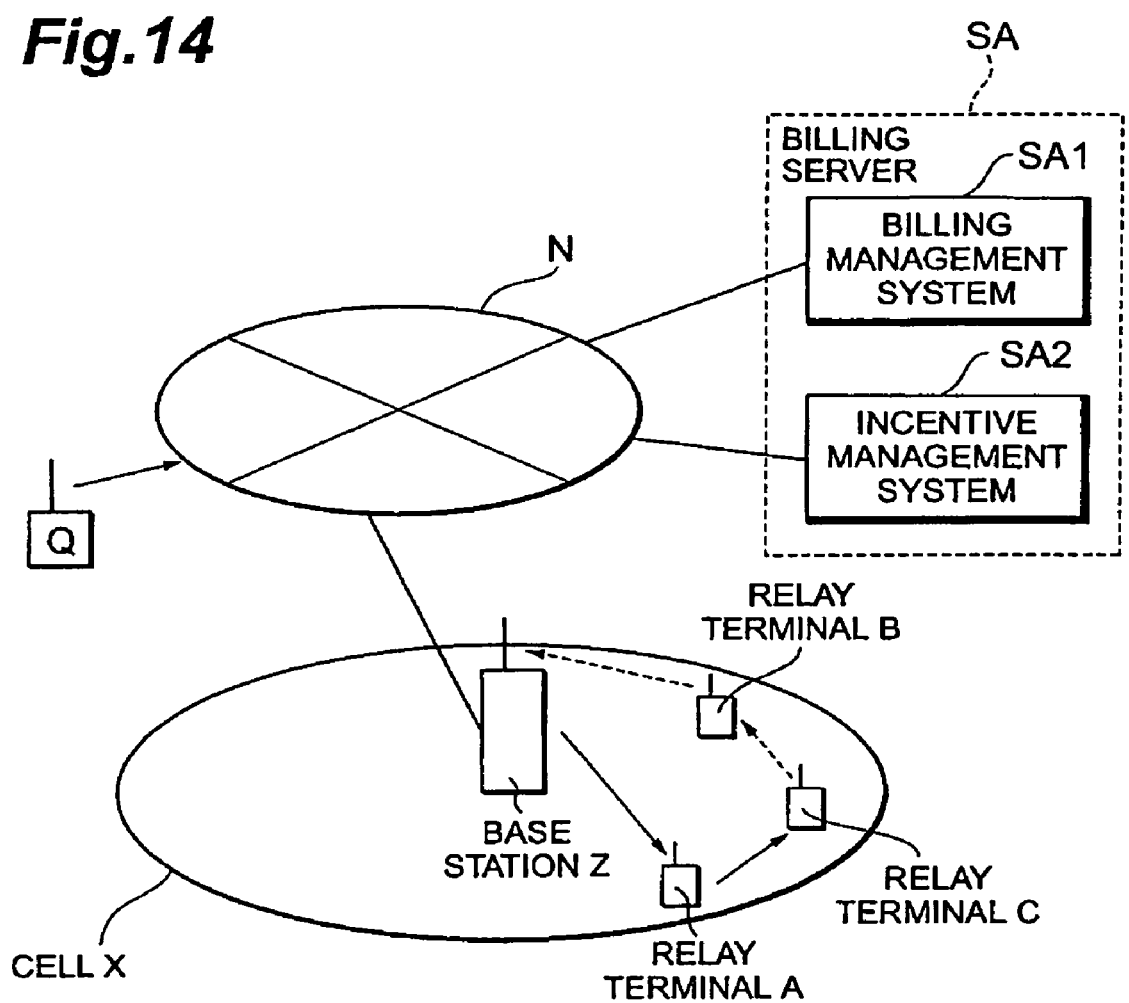
FIG. 14 is a system configuration diagram according to an embodiment.

FIG. 14 is a system configuration diagram according to an embodiment. The present example illustrates a case where the destination terminal C is located within the service area (cell X) of the base station Z. In this case, when the terminal Q transmits a signal to the destination terminal C, the relay terminals A, B can relay the signal. In this case, instead of identifying whether the destination terminal C is located outside the cell X, it is identified whether the destination terminal C is, for example, in a state in which a relayed signal is weak, though being located in the cell X, and in the case where the destination terminal is in this state, the relay terminals A, B relay the signal. The other system configuration is the same as described above.

INDUSTRIAL APPLICABILITY

The present invention is applicable to the relay terminals, base stations, billing servers, communication systems, billing methods, computer data signals, programs, and storage media.

The invention claimed is:

1. A relay terminal for relaying packet communication between a destination terminal and a base station, said relay terminal comprising:
   measuring means for measuring a contribution to the relaying; and
   transmitting means for transmitting a measurement result of the contribution to a billing server connected to a network including the base station and configured to store an information communication charge of the relay terminals,
   wherein when there are a plurality of relay terminals for relaying packets, the measuring means of each relay terminal measures as the contribution a value obtained by dividing a physical quantity used for communication in each relay terminal, by the number of relay terminals.

2. The relay terminal according to claim 1, wherein said measuring means comprises identifying means for identifying whether a header included in the packets is one associated with relaying; and a counter configured to increment a count number thereof in proportion to the number of packets transmitted and/or received during relaying when the identifying means identifies an occasion of relaying, and wherein a value proportional to the count number is transmitted as a measurement result of the number of packets to the billing server.

3. The relay terminal according to claim 2, wherein the transmitting means transmits the value proportional to the count number along with identification information obtained by the identifying means, as the measurement result to the billing server.

4. The relay terminal according to claim 1, wherein the measuring means comprises identifying means for identifying whether a control message included in the packets represents a start of communication or an end of communication; and calculating means for calculating a time period between a receiving time of the control message at the start of communication and a receiving time of the control message at the end of communication, identified by the identifying means, and wherein said time period is transmitted as said relay time to the billing server.

5. The relay terminal according to claim 1, wherein a communication system during the relaying is time division multiple access, and wherein the measuring means comprises storage means for storing the number of timeslots, the number of carriers, and the number of frames, used in transmission and receiving of the packets; and calculating means for calculating the amount of radio resources as the contribution from the values stored in the storage means.

6. The relay terminal according to claim 1, wherein a communication system during the relaying is code division multiple access, and wherein the measuring means comprises storage means for storing the number of timeslots, the number of carriers, and the number of codes, used in transmission and receiving of the packets; and calculating means for calculating the amount of radio resources as the contribution from the values stored in the storage means.

7. A communication system comprising a base station for relaying the measurement result transmitted from the relay terminal as set forth in claim 1 to the billing server.

8. The relay terminal according to claim 1, wherein when the destination terminal is located outside a service area of the base station, the measuring means measures the contribution.

9. A base station for implementing packet communication with a destination terminal through a relay terminal, said base station comprising:
   measuring means for measuring a contribution to relaying by the relay terminal; and
   transmitting means for transmitting a measurement result of the contribution to a billing server connected to a network including the base station and configured to store an information communication charge of the relay terminal,
   wherein when there are a plurality of relay terminals for relaying packets, the measuring means of each relay terminal measures as the contribution a value obtained by dividing a physical quantity used for communication in each relay terminal, by the number of relay terminals.

10. The base station according to claim 9, wherein when the destination terminal is located outside a service area of the base station, the measuring means measures the contribution.

11. A billing server for storing an information communication charge of a relay terminal, said billing server comprising:
    receiving means for receiving a contribution to relaying by the relay terminal for relaying packet communication between a destination terminal and a base station; and
    billing means for effecting negative billing according to the contribution received by the receiving means, on the information communication charge stored,
    wherein when the contribution is not less than a reference value, an amount of the negative billing is set to a given value.

12. The billing server according to claim 11, wherein when the destination terminal is located outside a service area of the base station, the receiving means receives the contribution.

13. A billing server for storing an information communication charge of a relay terminal, said billing server comprising:
    receiving means for receiving a contribution to relaying by the relay terminal for relaying packet communication between a destination terminal and a base station; and
    billing means for effecting negative billing according to the contribution received by the receiving means, on the information communication charge stored,
    wherein an amount of the negative billing is set to a value proportional to a level of the contribution.

14. A billing server for storing an information communication charge of a relay terminal, said billing server comprising:
    receiving means for receiving a contribution to relaying by the relay terminal for relaying packet communication between a destination terminal and a base station; and
    billing means for effecting negative billing according to the contribution received by the receiving means, on the information communication charge stored,
    wherein an amount of the negative billing is set at or below a predetermined maximum amount.

15. A billing server for storing an information communication charge of a relay terminal, said billing server comprising:

receiving means for receiving a contribution to relaying by the relay terminal for relaying packet communication between a destination terminal and a base station; and billing means for effecting negative billing according to the contribution received by the receiving means, on the information communication charge stored, wherein the contribution by the relay terminal is classified into one group out of a plurality of groups obtained by dividing a set of contributions of relay terminals according to the contributions, and wherein the negative billing is effected based on a value of a base amount correlated with a weighting factor corresponding to each group.

16. The billing server according to claim 15, wherein said correlation is multiplication.

17. A billing server for storing an information communication charge of a relay terminal, said billing server comprising:

receiving means for receiving a contribution to relaying by the relay terminal for relaying packet communication between a destination terminal and a base station; and billing means for effecting negative billing according to the contribution received by the receiving means, on the information communication charge stored, wherein when an amount of the negative billing is greater than the information communication charge stored in a predetermined period, a difference between the information communication charge and the amount of the negative billing is stored for a fixed period and the negative billing is effected on a next information communication charge on the basis of the stored difference.

18. A billing method of an information communication charge comprising:

storing an information communication charge of a relay terminal in a storage device;

receiving a contribution to relaying by the relay terminal for relaying packet communication between a destination terminal and a base station; and effecting negative billing calculation according to the received contribution on the information communication charge stored in the storage device, wherein when the contribution is not less than a reference value, an amount of the negative billing is set to a given value.

19. A computer data signal included in a carrier wave, said computer data signal letting a computer having read the signal, execute:

storing an information communication charge of a relay terminal in a storage device; and receiving a contribution to relaying by the relay terminal for relaying packet communication between a destination terminal and a base station and effecting negative billing calculation according to the received contribution, on the information communication charge stored in the storage device, wherein when the contribution is not less than a reference value, an amount of the negative billing is set to a given value.

20. A relay terminal for relaying packet communication between a destination terminal and a base station, said relay terminal comprising:

measuring means for measuring a contribution to the relaying; and calculating means for calculating from a measurement result by the measuring means, a value to be deducted from an information communication charge in a billing server connected to a network including the base station and configured to store the information communication charge of the relay terminal, wherein when the contribution is not less than a reference value, the value to be deducted corresponds to negative billing which is set to a given value.

21. The relay terminal according to claim 20, wherein when the destination terminal is located outside a service area of the base station, the measuring means measures the contribution.

22. A billing method of an information communication charge comprising:

transmitting a contribution to relaying by a relay terminal for relaying packet communication between a destination terminal and a base station, from the relay terminal; and effecting negative billing calculation according to the contribution, on an information communication charge stored in a predetermined storage device, wherein when the contribution is not less than a reference value, an amount of the negative billing is set to a given value.

23. The billing method of the information communication charge according to claim 22, comprising an identification step of identifying whether a header included in the packets is one associated with relaying; and a step of incrementing a count number of a counter in proportion to the number of packets transmitted and/or received during relaying when the identification step results in identifying an occasion of relaying, wherein the transmitting step is to transmit a value proportional to the count number as the contribution.

24. A program for letting a computer execute a step of storing an information communication charge of a relay terminal in a storage device; and a step of receiving a contribution to relaying by the relay terminal for relaying packet communication between a destination terminal and a base station and effecting negative billing calculation according to the received contribution on the information communication charge stored in the storage device, wherein when the contribution is not less than a reference value, an amount of the negative billing is set to a given value.

* * * * *